US008990105B1

(12) United States Patent
Shatkin-Margolis et al.

(10) Patent No.: US 8,990,105 B1
(45) Date of Patent: Mar. 24, 2015

(54) SYSTEMS, METHODS, AND MEDIA FOR TARGETING ADVERTISEMENTS BASED ON USER SEARCH INFORMATION

(75) Inventors: Joshua B. Shatkin-Margolis, New York, NY (US); Niels J. Meersschaert, Brooklyn, NY (US)

(73) Assignee: Magnetic Media Online, Inc., New York, NY (US)

( * ) Notice: Subject to any disclaimer, the term of this patent is extended or adjusted under 35 U.S.C. 154(b) by 359 days.

(21) Appl. No.: 12/984,520

(22) Filed: Jan. 4, 2011

Related U.S. Application Data

(60) Provisional application No. 61/293,193, filed on Jan. 7, 2010.

(51) Int. Cl.
*G06Q 30/02* (2012.01)

(52) U.S. Cl.
CPC ............ *G06Q 30/02* (2013.01); *G06Q 30/0251* (2013.01); *G06Q 30/0256* (2013.01); *G06Q 30/0277* (2013.01)
USPC .................. 705/14.54; 705/14.53; 705/14.73; 705/14.49; 705/14.25

(58) Field of Classification Search
None
See application file for complete search history.

(56) References Cited

U.S. PATENT DOCUMENTS

| | | | | |
|---|---|---|---|---|
| 6,047,327 A * | 4/2000 | Tso et al. | ....................... | 709/232 |
| 6,904,408 B1 * | 6/2005 | McCarthy et al. | ................ | 705/2 |
| 6,925,456 B2 * | 8/2005 | Nakano et al. | ......................... | 1/1 |
| 6,973,492 B2 * | 12/2005 | Streble | ........................... | 709/224 |
| 7,007,074 B2 * | 2/2006 | Radwin | ......................... | 709/217 |
| 7,548,915 B2 * | 6/2009 | Ramer et al. | ................ | 705/14.54 |
| 7,693,863 B2 * | 4/2010 | Martin et al. | .................. | 707/603 |
| 7,716,161 B2 * | 5/2010 | Dean et al. | .................. | 705/14.49 |
| 7,747,745 B2 * | 6/2010 | Shkedi | ........................... | 709/225 |
| 7,801,899 B1 * | 9/2010 | Spitkovsky | ..................... | 707/748 |
| 7,860,859 B2 * | 12/2010 | Haugen et al. | ................. | 707/721 |
| 7,930,236 B2 * | 4/2011 | Error et al. | ....................... | 705/37 |
| 7,962,463 B2 * | 6/2011 | Cava | ............... | 707/706 |
| 8,001,105 B2 * | 8/2011 | Bolivar et al. | ................. | 707/709 |
| 8,204,838 B2 * | 6/2012 | Schwaighofer et al. | ......... | 706/12 |
| 2002/0082923 A1 * | 6/2002 | Merriman et al. | ............... | 705/14 |
| 2005/0065844 A1 * | 3/2005 | Raj et al. | ......................... | 705/14 |
| 2005/0160002 A1 * | 7/2005 | Roetter et al. | ................... | 705/14 |
| 2006/0282328 A1 * | 12/2006 | Gerace et al. | .................... | 705/14 |
| 2007/0067297 A1 * | 3/2007 | Kublickis | ........................... | 707/9 |
| 2007/0124288 A1 * | 5/2007 | Swanson et al. | ................... | 707/3 |
| 2008/0082396 A1 * | 4/2008 | O'Connor et al. | ............... | 705/10 |

(Continued)

*Primary Examiner* — John G Weiss
*Assistant Examiner* — Christopher Stroud
(74) *Attorney, Agent, or Firm* — Byrne Poh LLP

(57) ABSTRACT

Systems, methods, and media for targeting advertisements based on user search information are provided. In accordance with some embodiments of the present invention, the method comprises: receiving one or more seedwords relating to a topic for targeting advertisements; automatically selecting keywords for the topic based on the received one or more seedwords; determining and displaying a forecasted pixel volume value based at least in part on the automatically selected keywords; receiving an address associated with monitoring code and receiving one or more campaign targeting requirements that control when the monitoring code is served to users; and modifying the monitoring code to incorporate the automatically selected keywords and the one or more campaign targeting requirements, wherein the modified monitoring code instructs an advertisement server to serve one or more advertisements to a user based on matching user search information received from the user with the selected keywords and in response to determining that the user has accessed an affiliate website.

21 Claims, 23 Drawing Sheets

(56) References Cited

U.S. PATENT DOCUMENTS

| | | | |
|---|---|---|---|
| 2008/0183561 A1* | 7/2008 | Zohar et al. | 705/10 |
| 2008/0215418 A1* | 9/2008 | Kolve et al. | 705/10 |
| 2008/0256064 A1* | 10/2008 | Grois | 707/5 |
| 2008/0270417 A1* | 10/2008 | Roker | 707/10 |
| 2008/0294523 A1* | 11/2008 | Little | 705/14 |
| 2010/0005001 A1* | 1/2010 | Aizen et al. | 705/14.73 |
| 2010/0161378 A1* | 6/2010 | Josifovski et al. | 705/10 |
| 2010/0169356 A1* | 7/2010 | Malden et al. | 707/767 |

* cited by examiner

| List | Traffic | Average daily impressions | Average daily estimated cost |
|---|---|---|---|
| bic pen | | 33,910 | $0.00 |
| camera photography | | 32,262 | $0.00 |
| moisturiser skin | | 17,907 | $0.00 |
| camcorder | | 16,122 | $0.00 |
| headphones | | 13,245 | $0.00 |
| camera compact | | 11,868 | $0.00 |
| cd record us | | 11,695 | $0.00 |

SYSTEMS, METHODS, AND MEDIA FOR TARGETING ADVERTISEMENTS BASED ON USER SEARCH INFORMATION

CROSS-REFERENCE TO RELATED APPLICATIONS

This application claims the benefit of U.S. Provisional Patent Application No. 61/293,193, filed Jan. 7, 2010, which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to systems, methods, and media for targeting advertisements based on user search information. More particularly, the present invention relates to providing advertisers, data buyers, and/or data suppliers with the ability to retarget advertisements or any other suitable media content to users visiting websites regardless of editorial content based on previous user search information.

BACKGROUND OF THE INVENTION

Search engine marketing promotes a website by increasing the visibility of advertisements on a search results page displayed by a search engine. For example, an advertiser may purchase text-link search results for display on multiple search engines. For each search engine provider, the advertiser can pay the search engine provider when their advertisement is clicked by a user, which is sometimes referred to as pay-per-click (PPC). Alternatively, the advertiser can pay the search engine provider for the inclusion of a relevant advertisement, such as a listing in a directory. The advent of search engine marketing and paid search results advertising can be attributed to search engine providers' need for revenue. Nevertheless, search engine marketing is considered by advertisers to be one of the most effective approaches for reaching consumers and, more particularly, for reaching consumers that exhibit intent to purchase a good or a service.

Search engine marketers are concerned with the location and the position of an advertisement for a product or a service within search engine results for maximum exposure and effectiveness. However, search engine providers generally sell this advertisement space to the highest bidder. For example, when an advertiser places a bid for a particular keyword to trigger the display on an advertisement on a particular search engine, the highest bidder wins and pays the search engine provider the second highest bidding price—i.e., the advertiser pays the minimum amount necessary to maintain its position and/or placement on the particular page. Unlike the advertiser that is motivated to present highly valued advertisements to users, search engine providers are inclined to accept advertisements from advertisers that paid the most for that advertisement space. Because of this, it can be difficult to run effective advertising campaigns with such high pay-per-click rates.

Moreover, the advertisements allowed by search engine providers have generally been limited. For example, search engine providers generally limit advertisers to text advertisements that link a user to a particular web page. In another example, search engine providers provide an advertiser with an approach for site retargeting, where the advertiser can only target those users that have performed a search using their search engine and immediately visit the advertiser's website.

There is therefore a need in the art for approaches that provide effective online advertising based on previous user search information. Accordingly, it is desirable to provide methods, systems, and media that overcome these and other deficiencies of the prior art.

For example, the present invention provides advertisers, agencies, advertisement networks, advertisement exchanges, and publishers with approaches for targeting and/or retargeting media content based on previous user search information. In another example, using models that incorporate previous user search information, the present invention provides an approach for purchasing media content and/or inventory. In yet another example, using models that incorporate previous user search information, the present invention allows an advertiser to present an advertisement to a user or advertisement viewer on a different website after the user has exhibited the intent to purchase the advertiser's product or service.

SUMMARY OF THE INVENTION

In accordance with various embodiments, mechanisms for targeting advertisements based on user search information are provided.

In accordance with some embodiments of the present invention, a search retargeting application (sometimes referred to herein as "the application") is provided. The application, among other things, collects user search information on Internet users and identifies potential customers or users that are in "purchase mode" based on their search behavior.

Generally speaking, the search retargeting application and its features can be used by any suitable entity. That is, the application provides advertisers, data buyers, data providers, media buyers, and other advertising entities with the opportunity to target users that have searched for a product or a service, but prior to purchasing the product or the service. In addition, using user search information, the application allows advertisers to reach users that have likely never visited the website associated with the advertiser.

It should be noted that the application collects user search information (e.g., search terms, click-stream data, HyperText Transfer Protocol (HTTP) elements, etc.) and, more particularly, data from users that previously searched for a product or a service. This user search information is used as an indicator of intent. For example, the keywords "top ten cell phones, Android" entered by a user can be used by an advertiser to exhibit the user's intent to purchase a corresponding cellular telephone and related advertisements can be shown to the user. This is unlike site retargeting, which only allows advertisements to be targeted to those users that have performed a search and subsequently visited the advertiser's website.

In response to receiving targeting criteria or campaign targeting requirements from an advertiser or any other suitable entity (e.g., an ad network), the application matches these users to the targeting criteria and retargets the advertisements or inventory of the advertiser such that those advertisements and/or other media content are served to users that fit the targeting criteria when accessing a different website (e.g., one of multiple websites in a preferred network). That is, an advertiser may have an interest in showing advertisements to users after performing a search that includes particular terms or keywords. For example, a user enters the search terms "cell phone" into a search engine or a search toolbar and then accesses another website, such as www.cnn.com, where the application uses retargeting code to present the user with a "cell phone" advertisement from the advertiser.

Using search data and/or retargeting code, the application allows advertisers to reach Internet users that have recently shown behaviors or exhibited the intent for the advertiser's product or service. Retargeting advertisements or the inventory of an advertiser allows the advertiser to reach a user from a targeted segment or audience that may not be currently accessing the advertiser's website. For example, the user can be accessing an affiliate website when the advertiser's advertisement is presented.

These search retargeting mechanisms can be used in a variety of applications. In one suitable example, the application provides advertisers, data buyers (e.g., publishers, advertisement networks, advertisement exchanges), and data providers (e.g., search engine providers, search toolbar providers, owners of electronic commerce websites, owners of parked domains, or owners of DNS error pages) with user search information that can be applied to the media content inventory of an advertiser. In another suitable example, the application allows advertisers to use user search information to create or modify retargeting code, such as a tracking tag or a pixel tag, which allows advertisers to retarget users that loaded the retargeting code and have demonstrated an interest in the related topic. In yet another suitable example, the application allows advertising entities, such as advertisement exchange buyers, to purchase inventory for a particular targeted audience.

Systems, methods, and media for targeting advertisements based on user search information are provided. In accordance with some embodiments of the disclosed subject matter, the method comprises: receiving one or more seedwords relating to a topic for targeting advertisements; automatically selecting keywords for the topic based on the received one or more seedwords; determining and displaying a forecasted pixel volume value based at least in part on the automatically selected keywords; receiving an address associated with monitoring code and receiving one or more campaign targeting requirements that control when the monitoring code is served to viewers; and modifying the monitoring code to incorporate the automatically selected keywords and the one or more campaign targeting requirements, wherein the modified monitoring code instructs an advertisement server to serve one or more advertisements to a user based on matching user search information received from the user with the selected keywords and in response to determining that the user has accessed an affiliate website.

In some embodiments, a system for providing search retargeting to advertising entities is provided, the system comprising a processor that: receives one or more seedwords relating to a topic for targeting advertisements; automatically selects keywords for the topic based on the received one or more seedwords; determines and displays a forecasted pixel volume value based at least in part on the automatically selected keywords; receives an address associated with monitoring code and receiving one or more campaign targeting requirements that control when the monitoring code is served to users; and modifies the monitoring code to incorporate the automatically selected keywords and the one or more campaign targeting requirements, wherein the modified monitoring code instructs an advertisement server to serve one or more advertisements to a user based on matching user search information received from the user with the selected keywords and in response to determining that the user has accessed an affiliate website.

In some embodiments, a non-transitory computer-readable medium containing computer-executable instructions that, when executed by a processor, cause the processor to perform a method for providing search retargeting to advertising entities, the method comprising: receiving one or more seedwords relating to a topic for targeting advertisements; automatically selecting keywords for the topic based on the received one or more seedwords; determining and displaying a forecasted pixel volume value based at least in part on the automatically selected keywords; receiving an address associated with monitoring code and receiving one or more campaign targeting requirements that control when the monitoring code is served to users; and modifying the monitoring code to incorporate the automatically selected keywords and the one or more campaign targeting requirements, wherein the modified monitoring code instructs an advertisement server to serve one or more advertisements to a user based on matching user search information received from the user with the selected keywords and in response to determining that the user has accessed an affiliate website.

BRIEF DESCRIPTION OF THE DRAWINGS

Various objects, features, and advantages of the disclosed subject matter can be more fully appreciated with reference to the following detailed description of the invention when considered in connection with the following drawing, in which like reference numerals identify like elements.

FIG. 12 is an illustrative display for importing custom keyword lists in accordance with some embodiments of the present invention.

Figure 13:
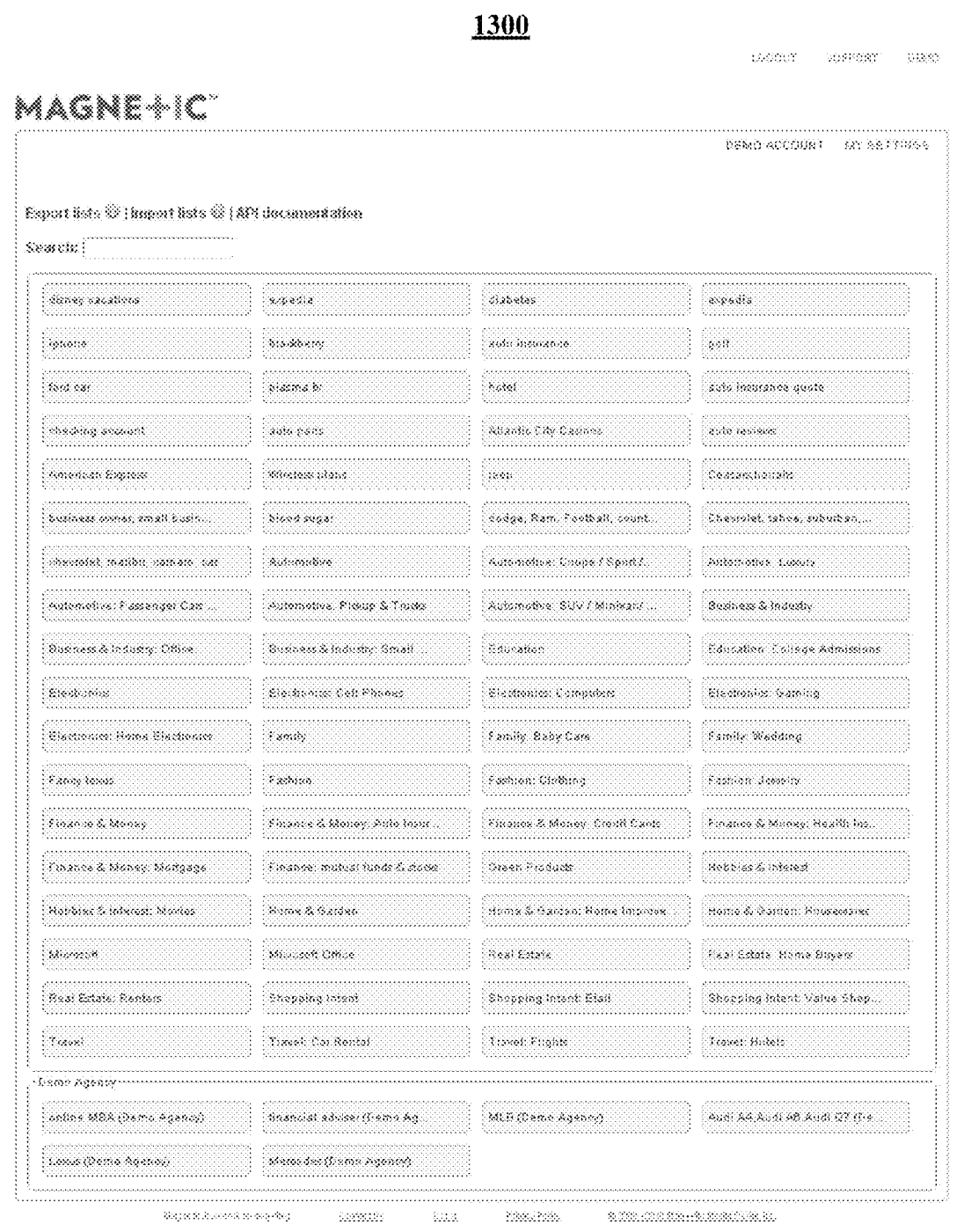

FIG. 13 is an illustrative display for managing targeted lists in accordance with some embodiments of the present invention.

FIG. 18 is an illustrative reporting display in accordance with some embodiments of the present invention.

DETAILED DESCRIPTION OF THE INVENTION

Systems, methods, and media for targeting advertisements based on user search information are provided.

In accordance with some embodiments of the present invention, a search retargeting application (sometimes referred to herein as "the application") is provided. The application, among other things, collects user search information on Internet users and identifies potential customers or users that are in "purchase mode" based on their search behavior. That is, the application provides advertisers and other users of the application with the opportunity to target users that have searched for a product or a service, but prior to purchasing the product or the service. In addition, using user search information, the application allows advertisers to reach users that have likely never visited the website associated with the advertiser.

Figure 1A:
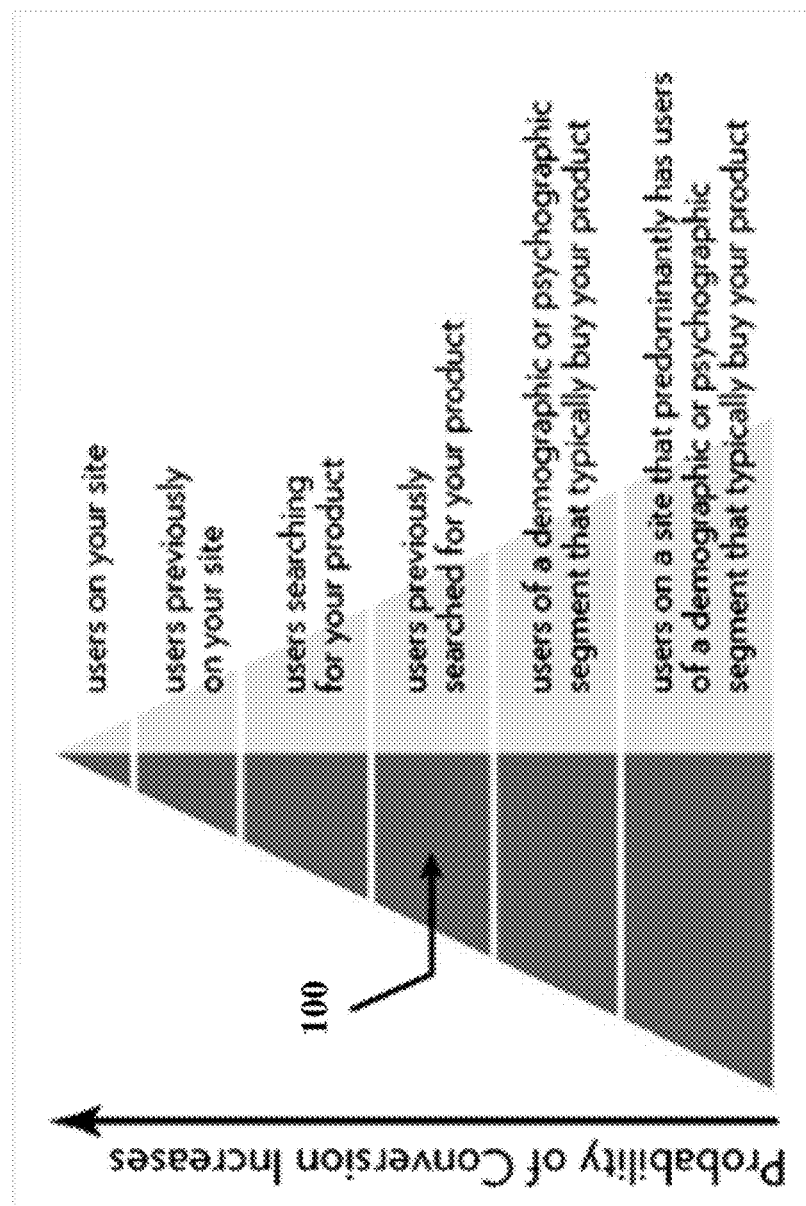
FIG. 1A is a diagram illustrating how the probability of conversion changes based on the type of user in accordance with some embodiments of the present invention.

As shown in FIG. 1A, note that the probability of conversion changes based on the type of user. For example, a user on a particular website, where the website predominantly has users of a particular demographic or psychographic segment that typically purchases an advertiser's product or service, has a lower probability of conversion than a user that is currently searching for the advertiser's product or service or a user that is currently visiting the advertiser's website. As described above, in accordance with the present invention, the application obtains user search information relating to users that have previously searched for an advertiser's product or service (portion 100 of FIG. 1A).

It should be noted that the application collects user search information (e.g., search terms, click-stream data, HyperText Transfer Protocol (HTTP) elements, etc.) and, more particularly, data from users that previously searched for a product or a service. This user search information is used as an indicator of intent. For example, the keywords "top ten cell phones, Android" entered by a user can be used by an advertiser to exhibit the user's intent to purchase a corresponding cellular telephone and related advertisements can be shown to the user. This is unlike site retargeting, which only allows advertisements to be targeted to those users that have performed a search and subsequently visited the advertiser's website.

It should also be noted, however, that personally identifiable information is not collected in order to protect the privacy of users. More particularly, non-personally identifiable information that cannot be used to identify a particular person or a particular entity is collected.

Figure 1B:
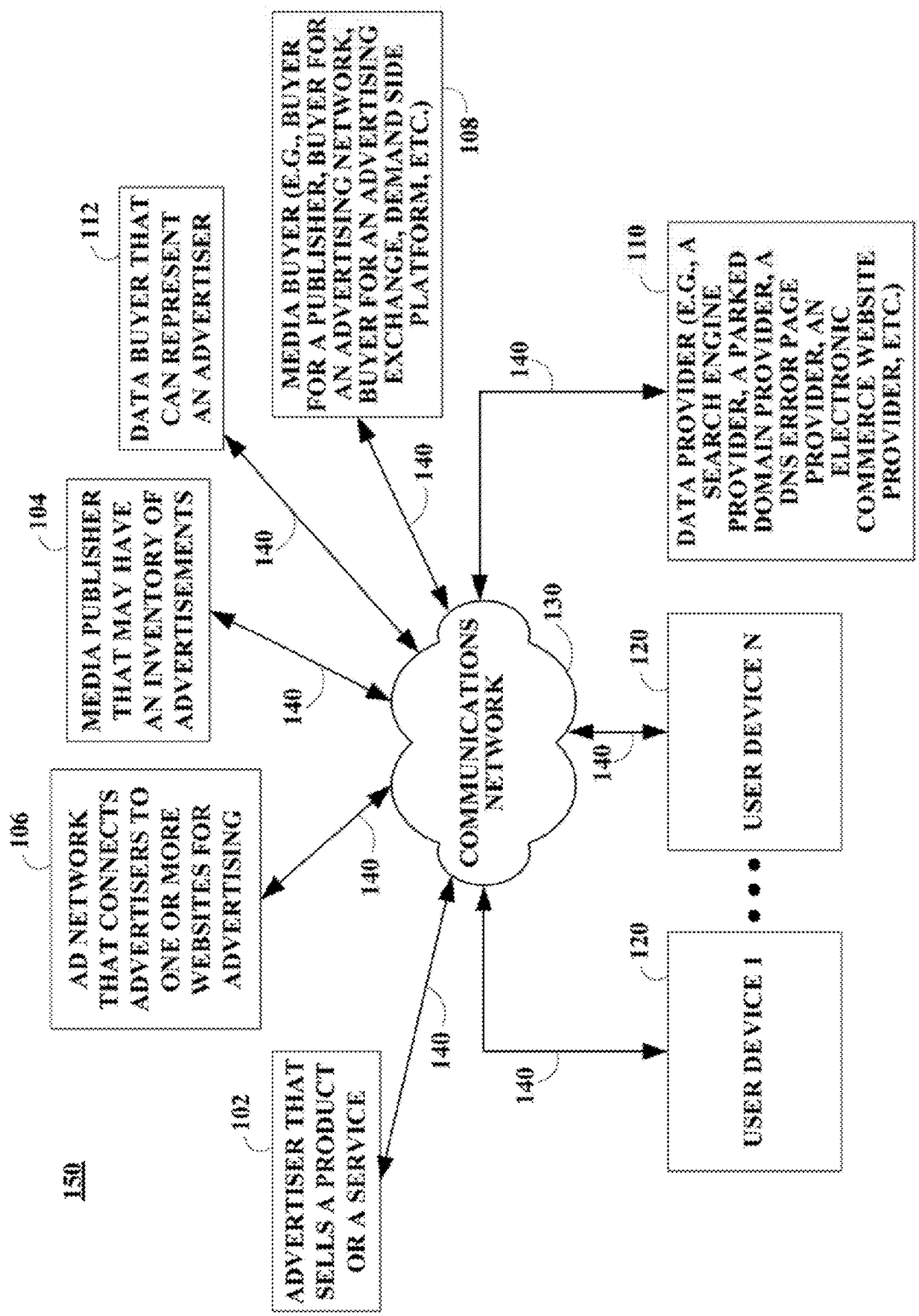
FIG. 1B is an illustrative architecture for online advertising in accordance with some embodiments of the present invention.

Referring to FIG. 1B, an illustrative architecture for online advertising is provided that shows the different entities that may use the application in accordance with some embodiments of the present invention. As shown, architecture 150 can include an advertiser 102. The advertiser 102 can be an individual or an entity that communicates information, such as media content, regarding goods and/or services to others. Using advertisements and/or other media content, the advertiser 102 may purchase advertisement space on a website to sell a product or a service. For example, a display advertiser, such as GEICO, displays advertisements and other media content on a social networking website (e.g., Facebook.com) and on an automobile quote website (e.g., AutoTrader.com) to entice users to purchase insurance. Using the application, the advertiser 102 can retarget advertisements such that the advertisements are matched to an audience in purchase mode (e.g., one of the users at user devices 120).

In some embodiments, architecture 150 can also include a media publisher 104. The media publisher 104 may have an inventory of advertisements and other media content for display on the website of the publisher. The advertiser 102 may place campaigns with media publisher 104 (e.g., NYTimes.com, CNN.com, etc.), where the media publisher 104 may receive payments based on traffic to an advertiser's website (e.g., in response to a user selecting the advertisement displayed in a space on the publisher's website). Using the application, the media publisher 104 can serve relevant advertisements to users viewing the publisher's website and substantially improve the click-through rate. Accordingly, the media publisher 104 can sell targeted campaigns to advertisers with a substantially improved click-through rate.

In some embodiments, architecture 150 can also include an ad network 106 that can be any suitable aggregator or broker, that connects advertisers 102 and their advertising inventory with publishers 104 or any other suitable websites for advertising. Using the application, the ad network 106 can define target audience segments and match them with existing inventory or purchase additional inventory based on user search information from one or more of the users at user devices 120.

In some embodiments, architecture 150 can also include a media buyer 108. For example, the media buyer 108 can be a media buyer that purchases media on an advertising exchange or any other suitable marketplace that facilitates the buying and selling of media advertising inventory from one or more ad networks 106 or any other suitable entity. In another example, the media buyer 108 can be using a demand side platform system for managing and purchasing media on one or more exchanges or Marketplaces. Using the application, the media buyer 108 can purchase the appropriate inventory for an advertiser 102. In particular, the media buyer 108 using the application can create targeted audience segments for targeting bids on advertisement inventory.

In some embodiments, architecture 150 can also include a data provider 110. The data provider 110 can be, for example, a search engine provider, a search toolbar provider, an electronic commerce website provider, a parked domain provider, or a DNS error page provider, or any other suitable entity. In response to obtaining user search information entered on a website associated with the data provider 110, the application can be used to retarget advertisements such that relevant advertisements are presented to users entering search information on an affiliate website (e.g., one of the users at user devices 120).

In some embodiments, architecture 150 can also include a data buyer 112. The data buyer 112 can represent, for example, an advertiser 102 or any other suitable entity. In some embodiments, the data buyer 112 can use user search information collected by the application to retarget advertisements such that the advertisements are matched to an audience in purchase mode (e.g., one of the users at user devices 120). In some embodiments, the data buyer 112 can be combined with any other suitable advertising entity. For example, the data buyer 112 can also be the media buyer 108, where the data and media buyer purchases media for an advertiser based on campaign targeting requirements (tailored for a particular audience segment) and purchases the ability to target the media using user search information.

Each of these entities (e.g., advertiser 102, media publisher 104, ad network 106, media buyer 108, data provider 110, data buyer 112, user devices 120) can be connected using any suitable communications network 130, such as the Internet, an intranet, a wide-area network, a local-area network, a wireless network, a digital subscriber line network, a frame relay network, an asynchronous transfer mode network, a virtual private network, or any combination of any of such networks. Communications links 140, such as network links, dial-up links, wireless links, hard-wired links, any other suitable communications links, or a combination of such links, can be any communications links suitable for communicating data between these various entities. It should also be noted that these entities can be located at any suitable location. In one embodiment, media publisher 104 and data buyer 112 may be located within an organization. Alternatively, media publisher 104 and data buyer 112 may be distributed between multiple organizations.

Accordingly, any suitable advertising entity, such as one of the entities in architecture 150, can use the application for search retargeting.

As also used herein, a "user" or a "viewer" generally refers to an individual or an entity that views an advertisement regarding a product or a service. For example, the user searches for a particular product using a search engine and, while considering the purchase options, the user views the advertiser's targeted advertisement while in "purchase mode" and while accessing a website unrelated to the advertiser (e.g., a general news site that is not associated with the advertiser). By displaying targeted advertisements to the user during his or her purchasing decision process, the application can significantly increase click-through rate (CTR) and/or conversion rate (e.g., the user buys the advertiser's product).

In response to receiving targeting criteria or campaign targeting requirements from an advertiser or any other suitable entity (e.g., an ad network), the application matches these users to the targeting criteria and retargets the advertisements or inventory of the advertiser such that those advertisements and/or other media content are served to users that fit the targeting criteria when accessing a different website (e.g., one of multiple websites in a preferred network). That is, an advertiser may have an interest in showing advertisements to users after performing a search that includes particular terms or keywords. For example, a user enters the search terms "cell phone" into a search engine or a search toolbar and then accesses another website, such as www.cnn.com, where the application uses retargeting code to present the user with a "cell phone" advertisement from the advertiser.

Using search data and/or retargeting code, the application allows advertisers to reach Internet users that have recently shown behaviors or exhibited the intent for the advertiser's product or service. Retargeting advertisements or the inventory of an advertiser allows the advertiser to reach a user from a targeted segment or audience that may not be currently accessing the advertiser's website. For example, the user can be accessing an affiliate website when the advertiser's advertisement is presented.

These search retargeting mechanisms can be used in a variety of applications.

In one suitable example, the application provides advertisers, data buyers (e.g., publishers, advertisement networks, advertisement exchanges), and data providers (e.g., search engine providers, search toolbar providers, owners of electronic commerce websites, owners of parked domains, or owners of DNS error pages) with user search information that can be applied to the media content inventory of an advertiser. These advertisers can use the user search information as an indicator of intent to retarget advertising campaigns to a substantially relevant audience, thereby obtaining higher click-through rates (CTR) at a lower cost-per-click (CPC). For example, advertisers can present relevant targeted advertisements to users that have searched for a particular keyword or keywords (e.g., the search terms "latest fashion trends, evening wear, hot winter looks").

In another suitable example, the application allows advertising entities to use user search information to create or modify retargeting code, such as a tracking tag or a pixel tag, which allows the advertising entities to retarget users that loaded the retargeting code and have demonstrated an interest in the related topic. In a more particular example, by adding the retargeting code to a parked domain or a DNS error webpage, the application enables retargeting in response to a user visiting the parked domain or DNS error webpage and searches for the desired keyword.

In yet another suitable example, the application allows advertising entities, such as advertisement exchange buyers or media buyers, to purchase inventory for a particular targeted audience. For example, an advertisement exchange buyer can use the application to input campaign targeting requirements of an advertiser, review forecasts including an estimated number of pixel impressions, and create targeted audience segments or intent-related audience segments. In response, the advertisement exchange buyer can identify and purchase display advertisements and/or any other suitable media content relevant to the campaign targeting requirements. In a more particular example, the application may sort through databases of content from multiple content providers and select one or more pieces of content for purchase.

Figure 2:
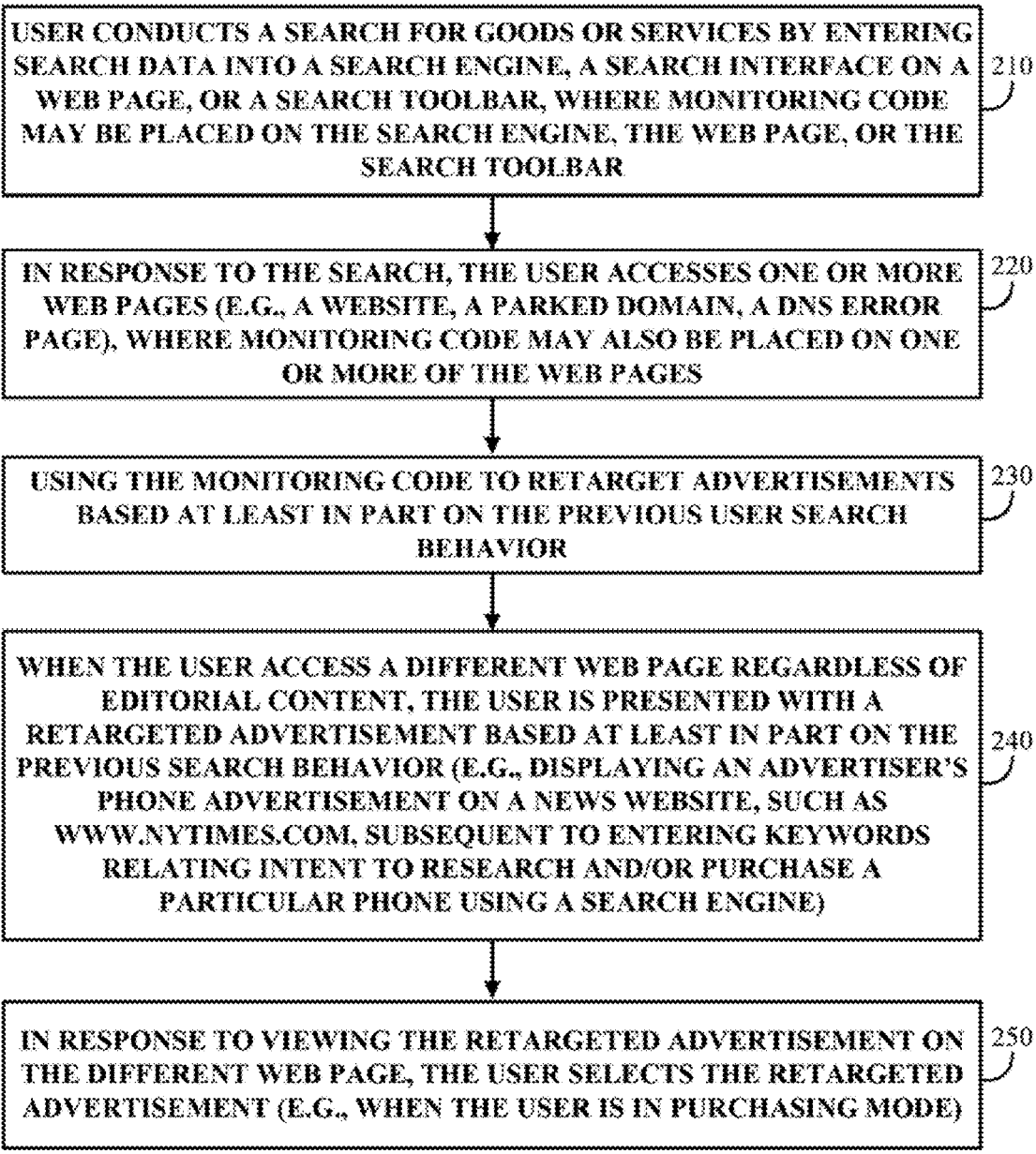
FIG. 2 is a diagram of an example of a process for retargeting advertisements based on user search information in accordance with some embodiments of the present invention.

FIG. 2 is a diagram showing an example of a process of retargeting advertisements to a user that previously searched for an advertiser's product or service in accordance with some embodiments of the present invention. As shown in FIG. 2, process 200 begins with a user conducting a search for a good or a service by entering search data into a search engine, a search interface on a website, or a search toolbar at 210. Monitoring code, such as a pixel tag, can be placed on the search engine, search interface, and/or search toolbar.

Generally speaking, monitoring code can be a pixel tag, a container tag, a cookie, a tracking tag, a web beacon, a web bug, a retargeting tag, any suitable combination thereof, or any other suitable portion of code placed on a search engine, a search interface, a search toolbar, or any other portion of a website to reconnect with the user that visited and/or interacted with the website. Monitoring code allows the advertiser to identify or track a user visiting the website and display advertisements and/or any other suitable media content at a later time. For example, in response to a user accessing a website using a web browser running on the user's computer, the monitoring code can be a 1 pixel×1 pixel image that is transmitted for display on the web browser and a cookie file for storing keywords and other user search information. In a more particular example, monitoring code can include a container tag for tracking and/or monitoring users, where the media holder's retargeting tag is served in response to the user searching for a keyword related to the target criteria specified for the retargeting tag.

It should be noted that the monitoring code is generally transparent to the user. When a web browser is used by the user to view a website and enter search criteria (e.g., search selections, keywords, wildcards, etc.), the web browser transmits a request to a web server to obtain content from one or more servers. The request can include, for example, the IP address of the user's computer, the time the content was requested, the type of web browser that made the request (e.g., Microsoft Internet Explorer, Netscape Navigator, Mozilla Firefox, etc.), and the stored monitoring code. When a web browser or any other suitable application is used to enter user search information on a search engine website for one or more websites matching the user search information, the inputted user search information can be collected using the monitoring code.

In some embodiments, the monitoring code can include static components populated by the advertiser, dynamic components populated by the advertiser, or any suitable combination thereof for retargeting advertisements to users. An illustrative example of the monitoring code (e.g., a container tag, a retargeting tag, etc.) that can be provided to the advertiser for the website is as follows:

<iframe src="http://domdex.com/f?c=[dynamically populated with an assigned company ID]&k=[dynamically populated with a single keyword or a comma-separated list of keywords]" width=0 height=0 frameborder=0></iframe>

In the above-mentioned example, an identification number and one or more keywords are dynamically populated into the monitoring code. The monitoring code receives the keywords and stores the keywords for use by an advertisement serving system.

Moreover, the application can integrate with pre-existing monitoring code to include or update the pre-existing code with retargeting and/or monitoring code. For example, a pre-existing pixel tag provided by an advertiser can be updated based on collected user search information such that particular advertisements are retargeted to the user receiving the updated pixel tag. In a more particular example, a pre-existing pixel tag can be updated with one or more keywords, where a retargeting tag is dynamically passed only when the user searches for particular keywords (e.g., "cell phone") such that each and every user the pixel served to has exhibited an intent or interest in a cell phone. In another example, a pre-existing pixel tag provided by a third-party advertisement server can be updated based on collected user search information such that particular advertisements from an advertiser's inventory can be retargeted and presented to a user after inputting one or more keywords that trigger the advertisement and upon accessing an affiliate website that is neither the search engine website nor the advertiser's website.

Referring back to FIG. 2, in response to performing a search using a search engine, the user is provided with selectable search results at 220. The user can access one or more web pages, such as an electronic commerce website, a parked domain, or a domain name system (DNS) error page, in response to selecting one of the search results. Similar to the search engine, monitoring code can also be placed on one of the web pages.

At 230, the monitoring code can be used to retarget advertisements to the user based at least in part on the user's previous search behavior. For example, the monitoring code can be used to determine that the user inputted the keywords "top cell phones" into a search engine or any other suitable web page. In response, the advertiser with campaign targeting requirements that match the user search information uses the monitoring code to serve advertisements to the particular user.

At 240, the user can be presented with a retargeted advertisement based on the user's previous search information while the user is accessing a different web page regardless of its editorial content. For example, as described above, the user inputted the keywords "top cell phone" into a search engine. In response, the monitoring code retargets a relevant advertisements directed to the promotion of a cellular telephone to the user when the user is accessing a general news website, such as www.nytimes.com.

It should be noted that, in some embodiments, the different web page that the user visits (e.g., www.nytimes.com) is one of a network of affiliate websites registered with the application. It should further be noted that the network of affiliate websites can be unassociated with the advertiser.

At 250, in response to viewing the advertisement on the affiliate web page, the user may select the retargeted advertisement, for example, when the user is in "purchase mode." Accordingly, the application allows advertisers to use user search information to reach users that are in "purchase mode" or have exhibited an intent to purchase and may have never visited the advertiser's website.

Figure 5:
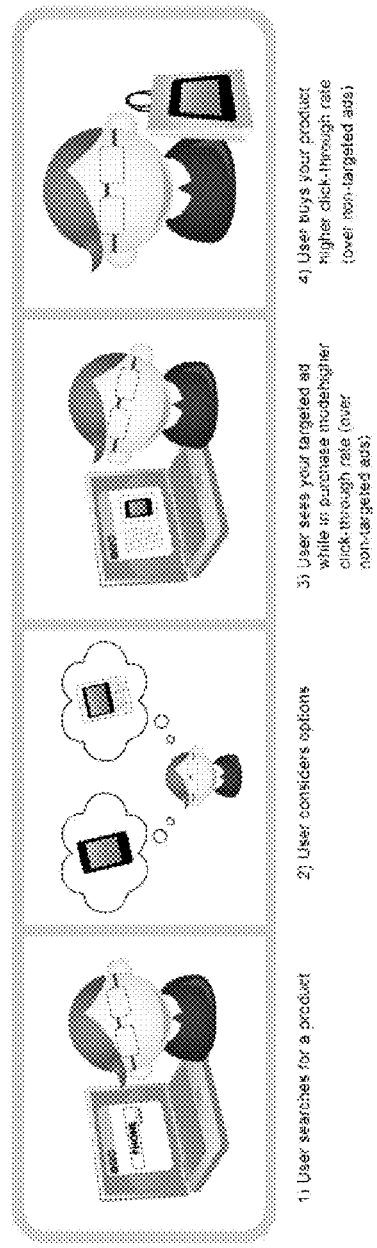
FIG. 5 is a diagram illustrates that the application assists an advertiser retarget advertisements based on user search information by displaying retargeted advertisements to a user that is visiting other websites in accordance with some embodiments of the present invention.

This is further illustrated in FIG. 5, where the user searches for a product or a service and then considers the options. In response to monitoring and/or collecting the user search information, the application uses the monitoring code to present the user with a targeted advertisement while the user is in purchase mode (e.g., as the user search information shows the user's intent to purchase). Upon selecting the targeted advertisement, the user may purchase the product.

As described previously, the advertiser using the application can be represented by any suitable data buyer (such as a publisher, an advertisement network, an advertisement exchange), any suitable data provider (such as a search engine provider, a search toolbar provider, an electronic commerce website provider, a parked domain provider, or a DNS error page provider), or any other suitable entity. FIGS. 3A-3E and 4A-4C show illustrative flow diagrams for allowing different advertising entities using the application to retarget advertisements with the use of user search information in accordance with some embodiments of the present invention. More particularly, FIGS. 3A-3E and 4A-4C show how the application can monetize the advertising entities when the user visits another website, such as an affiliate website.

Figure 3A:
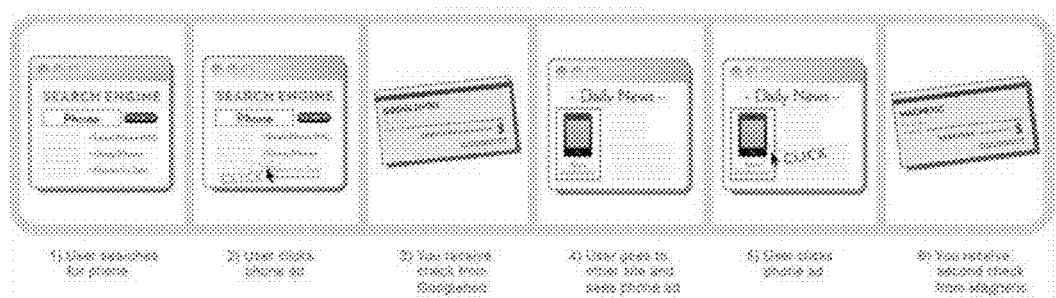
FIG. 3A is a diagram illustrating the use of the application to assist a data provider, such as a search engine provider, retarget advertisements based on user search information in accordance with some embodiments of the present invention.

FIG. 3A shows that, by using the monitoring code on a search results page of a search engine, a retargeted advertisement is provided to the user while visiting another website. In particular, FIG. 3A shows that the user inputs the keyword "phone" on a search engine and, when the user accesses an affiliate website, the monitoring code causes a phone advertisement from the advertiser's inventory to be presented to the user. In response to the user selecting the advertisement on that website, the data provider, such as a search engine provider, can receive a payment. In some embodiments, the application can automatically calculate and transmit the payment.

Figure 3B:
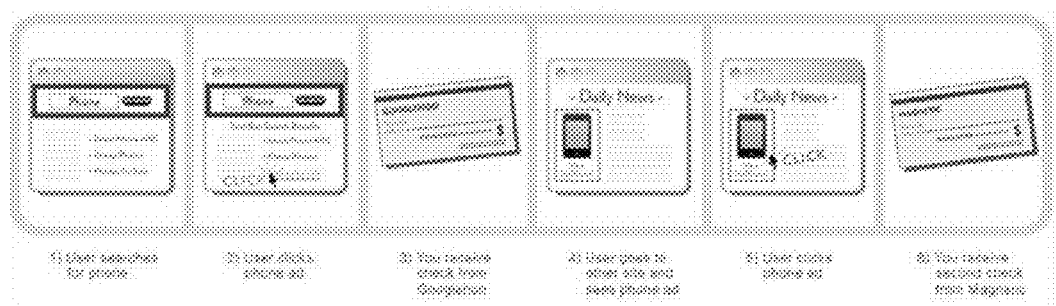
FIG. 3B is a diagram illustrating the use of the application to assist a data provider, such as a search toolbar provider, retarget advertisements based on user search information in accordance with some embodiments of the present invention.

Similarly, FIG. 3B shows the monitoring code embedded on a search toolbar or the search results page displayed after the search has been performed. In response to the user inputting the keyword "phone" on a search toolbar, a phone advertisement retrieved from the advertiser's inventory can be presented to the user, while the user is accessing a different website. In response to the user selecting the advertisement on an affiliate website, the data provider, such as a search toolbar provider, can receive a payment.

Figure 3C:
FIG. 3C is a diagram illustrating the use of the application to assist a data provider, such as an electronic commerce website provider, retarget advertisements based on user search information in accordance with some embodiments of the present invention.

FIG. 3C shows that the application can allow the advertiser to reach users that have visited the advertiser's website and continue to reach those users while visiting other affiliate websites, particularly when those users exhibit an intent to purchase a good or a service. The advertiser, such as the owner of an electronic commerce website, can add the monitoring code to a landing or results page. In doing this, the application can collect data from the electronic commerce website or any other suitable data provider to enable other electronic commerce websites to retarget advertisements at those users. Some users may then purchase the good or service advertised on the advertiser's website, while other users may access other websites (including website associated or registered with the application). While accessing other websites, the monitoring code presents relevant advertisements based on the user search information to the user. In response to the user selecting the advertisement on that website, the data provider, such as an electronic commerce website provider, can receive a payment.

Figure 3D:
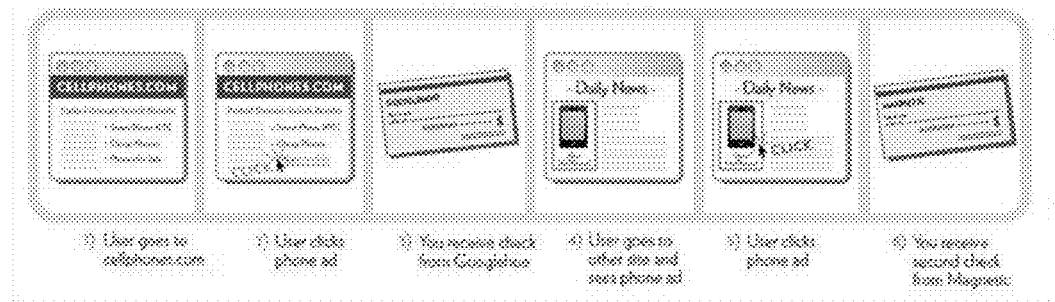
FIG. 3D is a diagram illustrating the use of the application to assist a data provider, such as a parked domain provider, retarget advertisements based on user search information in accordance with some embodiments of the present invention.

FIG. 3D shows that the application can allow the data provider, such as a parked domain provider, to reach users that have visited the parked domain and continue to reach those users while visiting other websites. Generally speaking, parked domain websites have little to no content but contain advertisements targeted at the topic of the keywords contained in the domain name, user search, or selected search keyword. As shown in FIG. 3D, in response to placing the monitoring code on the parked domain of "cellphones.com" and in response to the user accessing the parked domain, the monitoring code is loaded on the user's computer device, where retargeted advertisements are presented to the user when the user accesses other websites. In response to the user selecting the advertisement on that website, the data provider, such as a parked domain provider, can receive a payment.

Figure 3E:
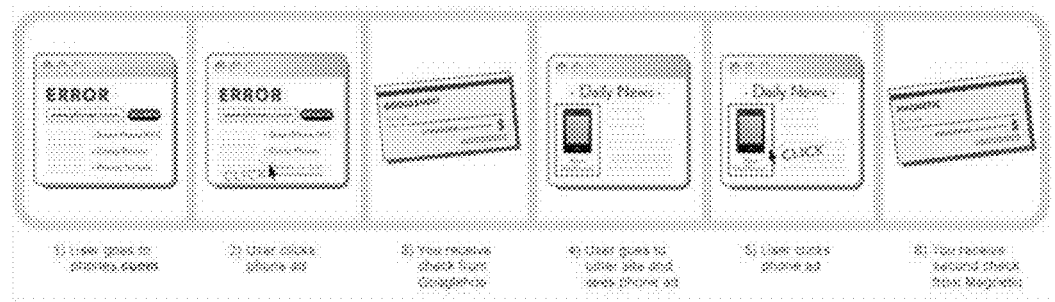
FIG. 3E is a diagram illustrating the use of the application to assist a data provider, such as an error page provider, retarget advertisements based on user search information in accordance with some embodiments of the present invention.

Similar to FIG. 3D, FIG. 3E shows that the application can allow the data provider, such as a error traffic provider, to reach users that have visited the DNS error website and continue to reach those users while visiting other websites. Generally speaking, a DNS error website can be displayed when a user types an invalid URL, such as "phones.cOOm." Note that the two o's in .com are an invalid route. In response to placing the monitoring code on the parked domain of "phones.cOOm" and in response to the user accessing the error page, the monitoring code is loaded on the user's computer device, where retargeted advertisements are presented to the user when the user accesses other websites. That is, the Internet Service Provider (ISP) or any other suitable entity transmits the user to a page with a search for phones. The application considers this a search and retargets advertisements to the user when the user accesses other websites. In response to the user selecting the advertisement on that website, the data provider, such as a DNS error page provider, can receive a payment.

In some embodiments, collected user search information and monitoring code can be used by the application to assist the advertiser to better target an inventory of advertisements. More particularly, user search information can be used to retarget advertisements, thereby serving relevant advertisements to users. Accordingly, this can increase the value of the inventory for the publisher and, thus, significantly increases cost per impressions (CPM). In addition, this can also improve the monetization of the advertiser's inventory, where click per action (CPA) is significantly decreased for the advertiser. Generally speaking, with regard to CPA, the advertiser pays for a particular action (e.g., conversion) that is connected with an advertisement.

Figure 4A:
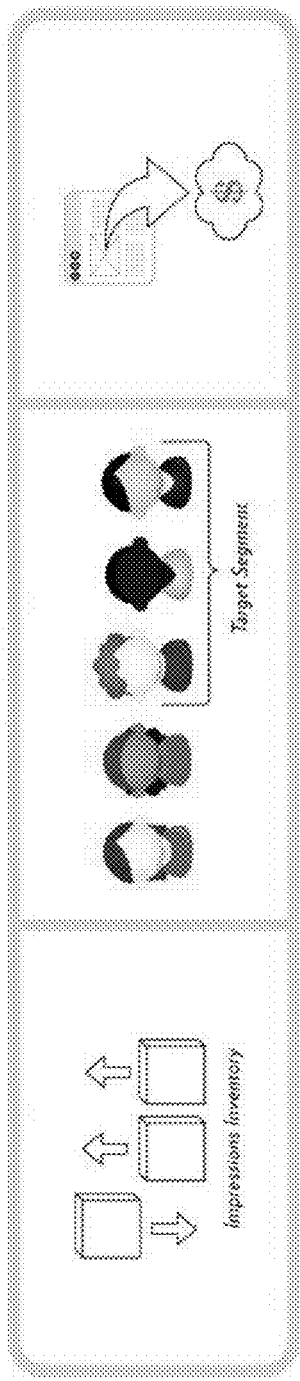
FIG. 4A is a diagram illustrates that the application assists a media publisher select advertisements for retargeting based on user search information in accordance with some embodiments of the present invention.

As shown in FIG. 4A, the application can provide a media publisher with an opportunity to use user search information to retarget their inventory of advertisements. The media publisher can use the application to define targeted segments or enter campaign targeting requirements within a current audience based on user intent. In particular, the application allows the media publisher to fine-tune an advertising campaign upon providing the creative and defining the target audience. It should also be noted that the application allows the media publisher to present advertisements to intent-related audience segments based on their previous user search information rather than on content alone.

Figure 4B:
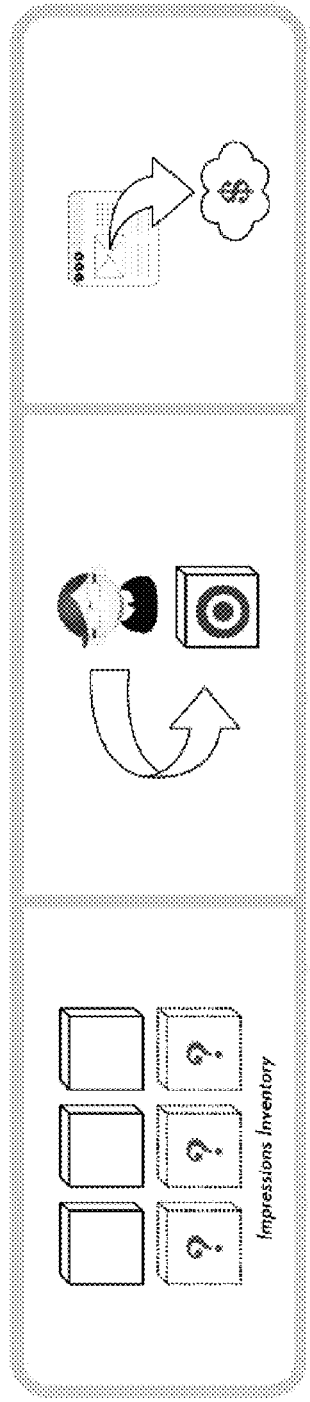
FIG. 4B is a diagram illustrates that the application assists an advertising network of media publishers purchase advertisements that match particular audience segments based on user search information in accordance with some embodiments of the present invention.
Figure 4C:
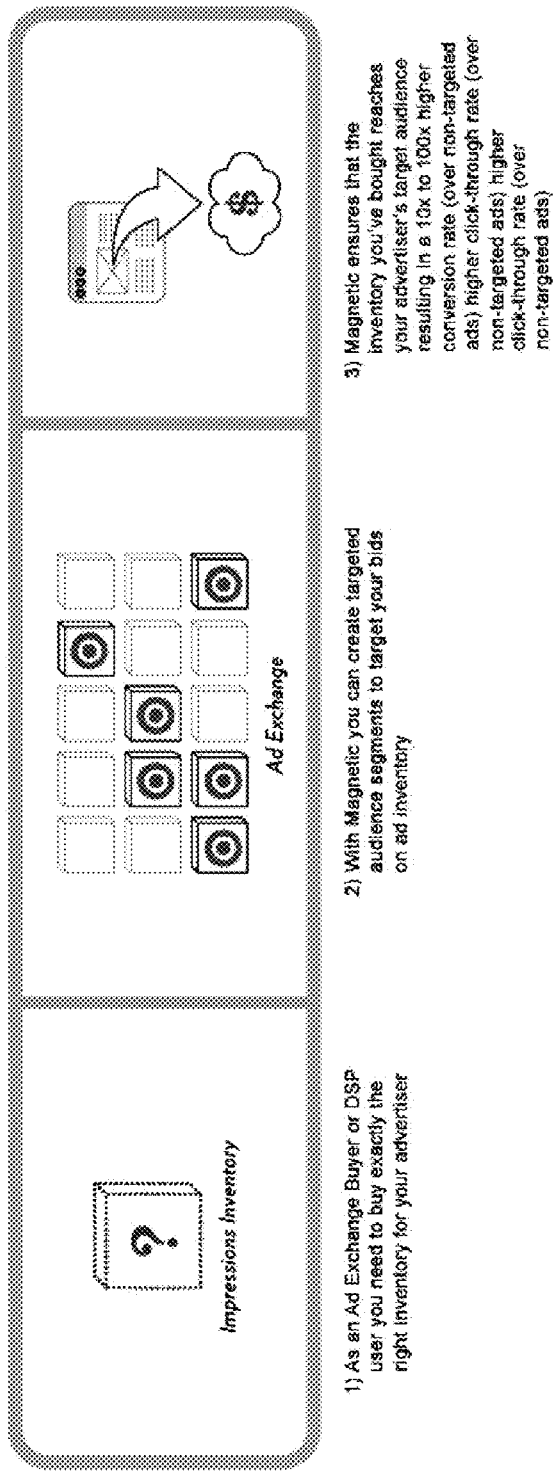
FIG. 4C is a diagram illustrates that the application assists a media buyer on an advertising exchange, such as an advertisement exchange buyer or a demand-side platform user, purchase advertisements for an advertiser that match particular audience segments based on user search information in accordance with some embodiments of the present invention.

As shown in FIG. 4B, in addition to improving the use of a media publisher's own inventory, the application allows an advertising network of media publishers to purchase advertisements and other media content from content providers that meet the targeted audience segments defined by the advertising network. Similarly, FIG. 4C shows that a media buyer on an advertisement exchange, such as an advertisement exchange buyer or a demand-side platform user, can use the application to purchase the appropriate inventory for an advertiser. In some embodiments, the application can purchase the appropriate inventory for the advertisement exchange buyer or demand-side platform user in response to receiving targeted audience segments. Alternatively, in response to receiving targeted audience segments, the application can use user search information to identify the appropriate inventory or provide the advertiser with instructions or guidelines for purchasing advertisements or any other suitable media content for an advertisement inventory.

Figure 6:
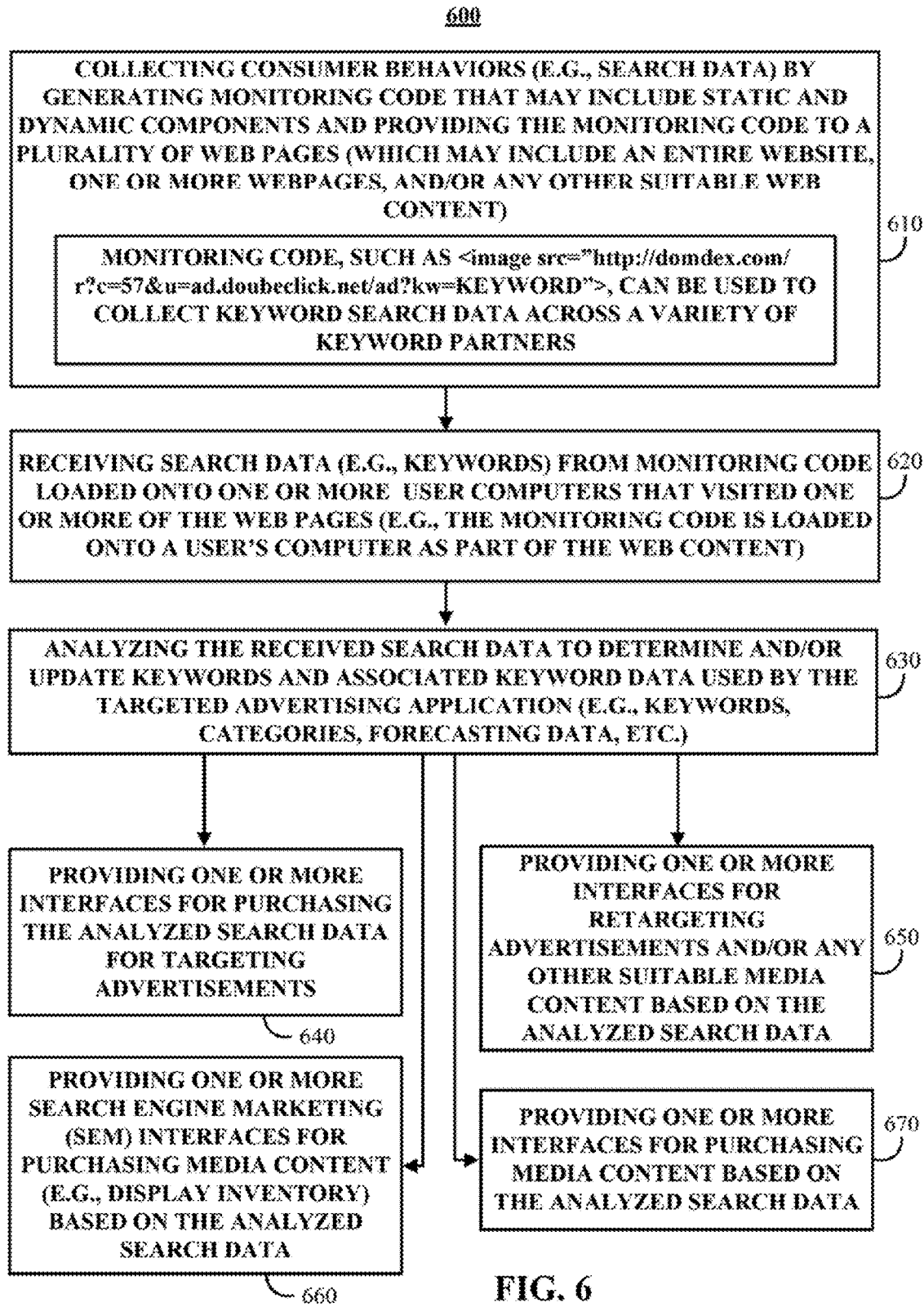
FIG. 6 is a diagram of an example of a process for providing interfaces to a data buyer or any other suitable user of the application based on user search information that is collected from multiple users in accordance with some embodiments of the present invention.

In accordance with some embodiments, the application can provide the advertiser, data buyer, or any other suitable advertising entity with the ability to retarget a user that has searched for particular keywords on the Internet (e.g., entering keyword into a search engine website). FIG. 6 shows an illustrative example of a process for providing multiple interfaces that allow the data buyer to apply user search information.

At 610, process 600 begins by collecting consumer behaviors, such as search terms, click-stream data, and/or HTTP protocol elements. More particularly, user search information, such as keywords, can be received from publisher websites containing such data and provided to other advertising systems (e.g., third-party advertisement serving systems) for retargeting. It should be noted that the publisher website containing such data can be any suitable website. For example, the publisher website can be the advertiser's website. In another example, the publisher website can be one of a network of websites selected by the advertiser. In yet another example, the publisher website can be one of a network of websites associated or registered with the application.

As described above, the application collects user search information by using monitoring code. The monitoring code, which can include static or dynamic components, is provided to one or more publisher websites (e.g., www.phones.com). The monitoring code is placed or included within the publisher website and provides user search information, such as keyword data, inputted on the publisher website. In a more particular example, the application can include monitoring code on multiple keyword partner websites or affiliate websites. That is, multiple websites can register with the application and, in response to the registration, receive monitoring code for placement on that website.

At 620, the monitoring code receives user search information, such as keywords, and stores the keywords to a cookie file (which, in some embodiments, is a portion of the monitoring code) for use by the application. In some embodiments, the stored keywords can be transmitted to the application for analysis (at 630). An example of such monitoring code is as follows:

<iframe src="http://domdex.com/f?c=57&k=KEY-WORD">

In some embodiments, the application can analyze the collected user search information. For example, the application can analyze the collected user search information to determine or update the list of relevant keywords used by the application. In another example, the application can analyze the collected user search information to supplement the search data with the position on a web page, frequency, size or type of font, etc.

It should be noted that, in some embodiments, keywords can be assigned to one or more categories, where each category generally relates to a specific topic. Additionally or alternatively to using keywords, the application allows the advertising entity to use categories to select which topics are to be targeted for the intent-related audience segment. For example, the keywords "Black Friday sales" and "coupon code" can be assigned to the category "Coupons, sales, and discounts." Based on collected user search information, the categories or the assignment of keywords into particular categories can be updated.

In another suitable embodiment, the application can calculate forecasts based on user search information. The application can calculate, using the monitoring code and the collected user search information, an estimate of the number of times users are searching for a particular keyword or a particular group of keywords. In a more particular example, the application can query the daily log files of the web servers receiving the monitoring code to determine how often each keyword is received. As mentioned above, each keyword can be assigned to one or more categories. The application can then determine how often each category has been searched by summing up the keyword estimations for each of the selected keywords in that category. It should be noted, however, that the keyword clusters or categories can overlap and the keyword selection portion of the application selects a subset of keywords from each cluster to target the list. The application can then determine the estimate by summing up the keyword estimations of the subset of keywords from each cluster.

Upon collecting and/or analyzing user search data, the application can provide the advertising entity, such as a data buyer, with multiple interfaces. For example, at 640, the application can provide the data buyer with one or more interfaces for purchasing the analyzed search information or a portion of the user search information for targeting advertisements. Moreover, the application can provide the data buyer with the ability to retarget advertisements based on user search information (e.g., previous search behavior of one or more users). In addition, at 650, the application can provide the advertising entity, such as a data buyer, with one or more interfaces for retargeting advertisements based on user search information, where the advertiser provides the address to a retargeting tag or any other suitable monitoring code and a target audience. Illustrative displays for retargeting advertisements based on user search information are shown, for example, in FIGS. 8-14.

Figure 7:
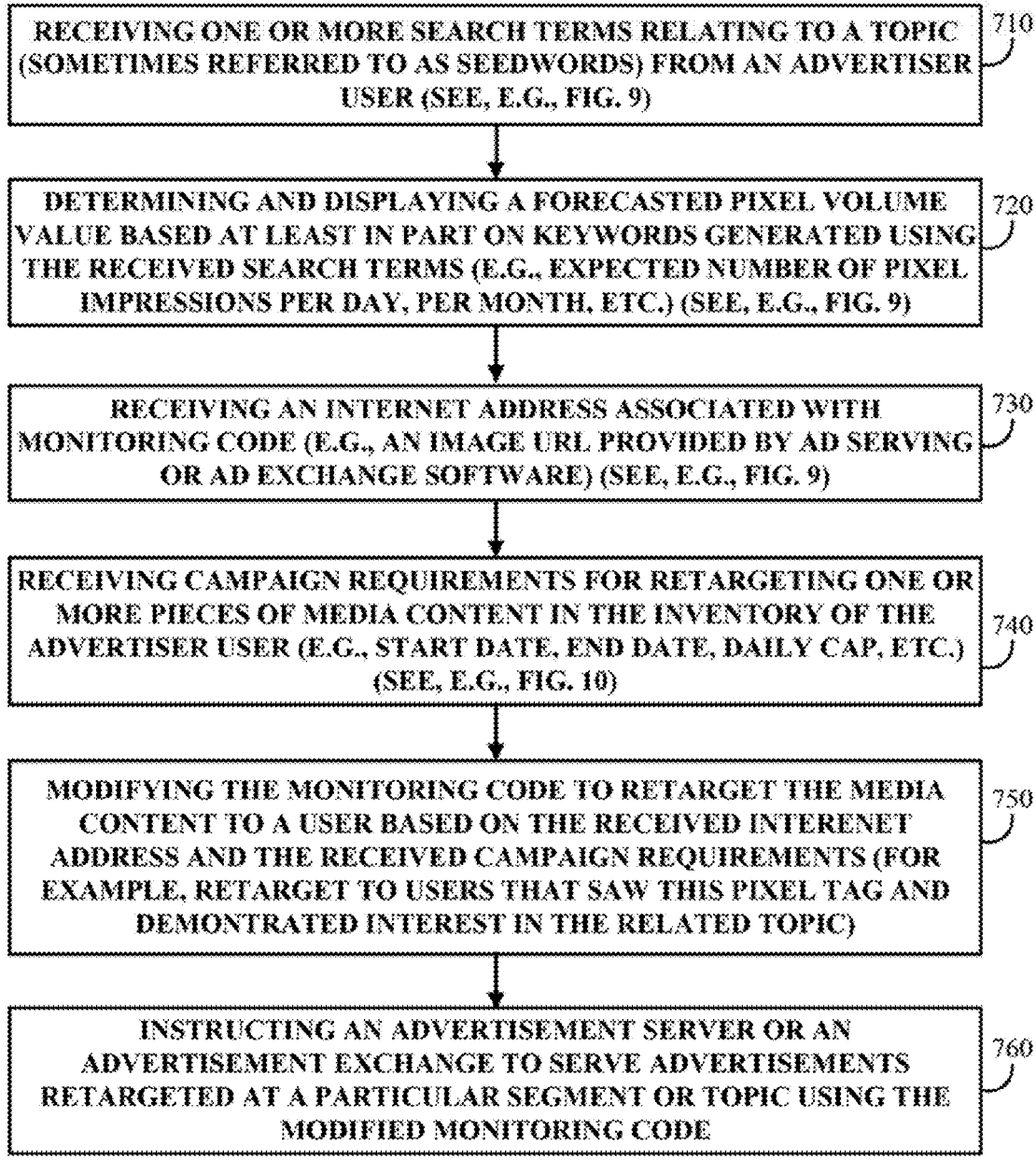
FIG. 7 is a diagram of an example of a process for providing retargeting interfaces to a data buyer or any other suitable user of the application in accordance with some embodiments of the present invention.
Figure 8:
FIGS. 8 and 9 are illustrative displays for entering one or more seedwords and one or more addresses associated with monitoring code in accordance with some embodiments of the present invention.
Figure 9:
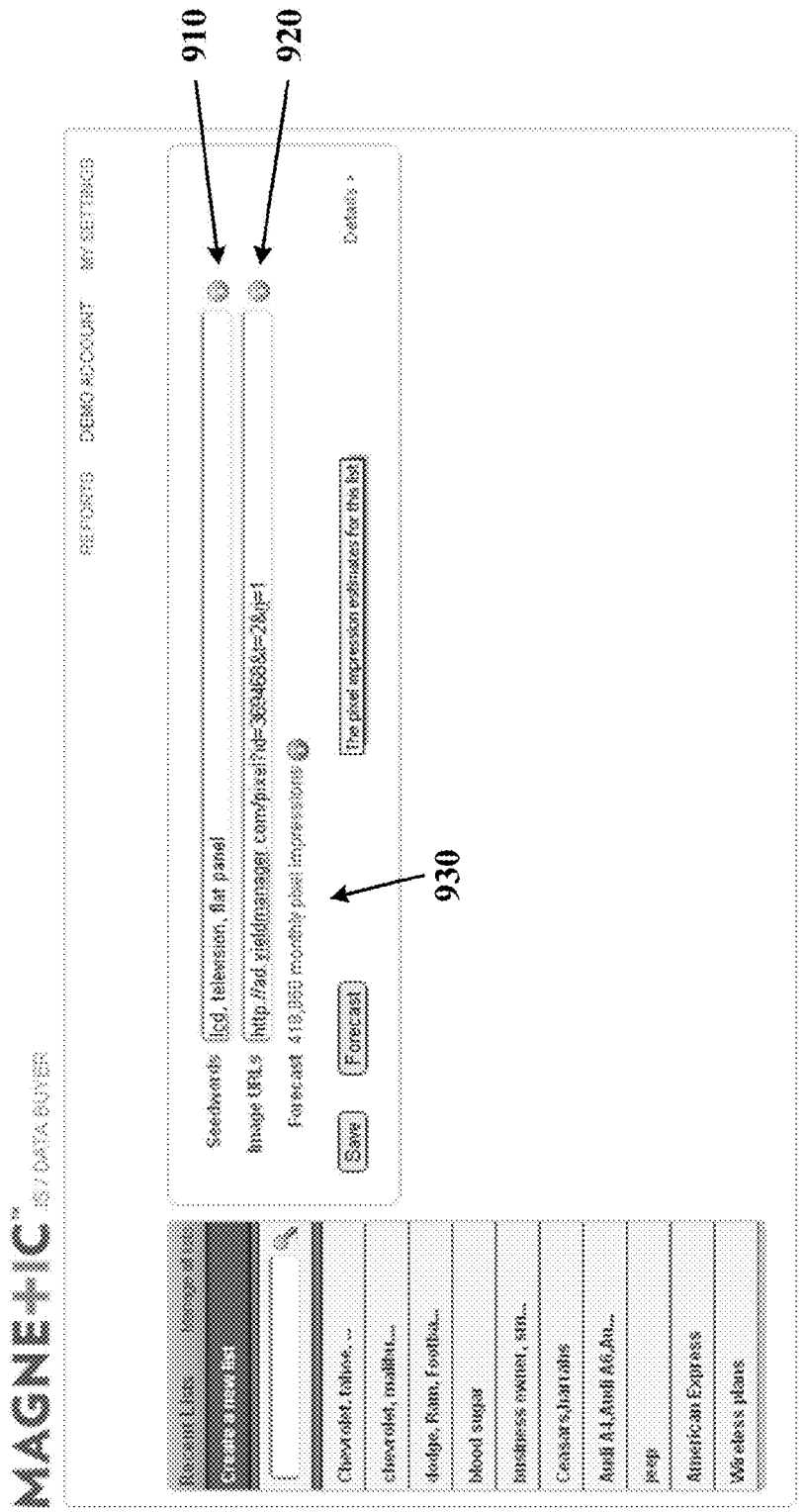

FIG. 7 illustrates an illustrative example of a process 700 for providing multiple interfaces that allow the data buyer to apply user search information. As shown, process 700 begins by receiving one or more search terms relating to atopic (sometimes referred to herein as "seedwords") from a data buyer. Generally speaking, a seedwords can be one or more words relating to a specific topic that the data buyer desires to target advertisements. In one example, the seedword can be a single word, such as "camcorder." In another example, the seedword can be a comma-separated list of words, such as "moisturizer, skin." As shown in FIGS. 8 and 9, the data buyer has entered the seedwords "lcd, television, flat panel" into field 910.

Figure 10:
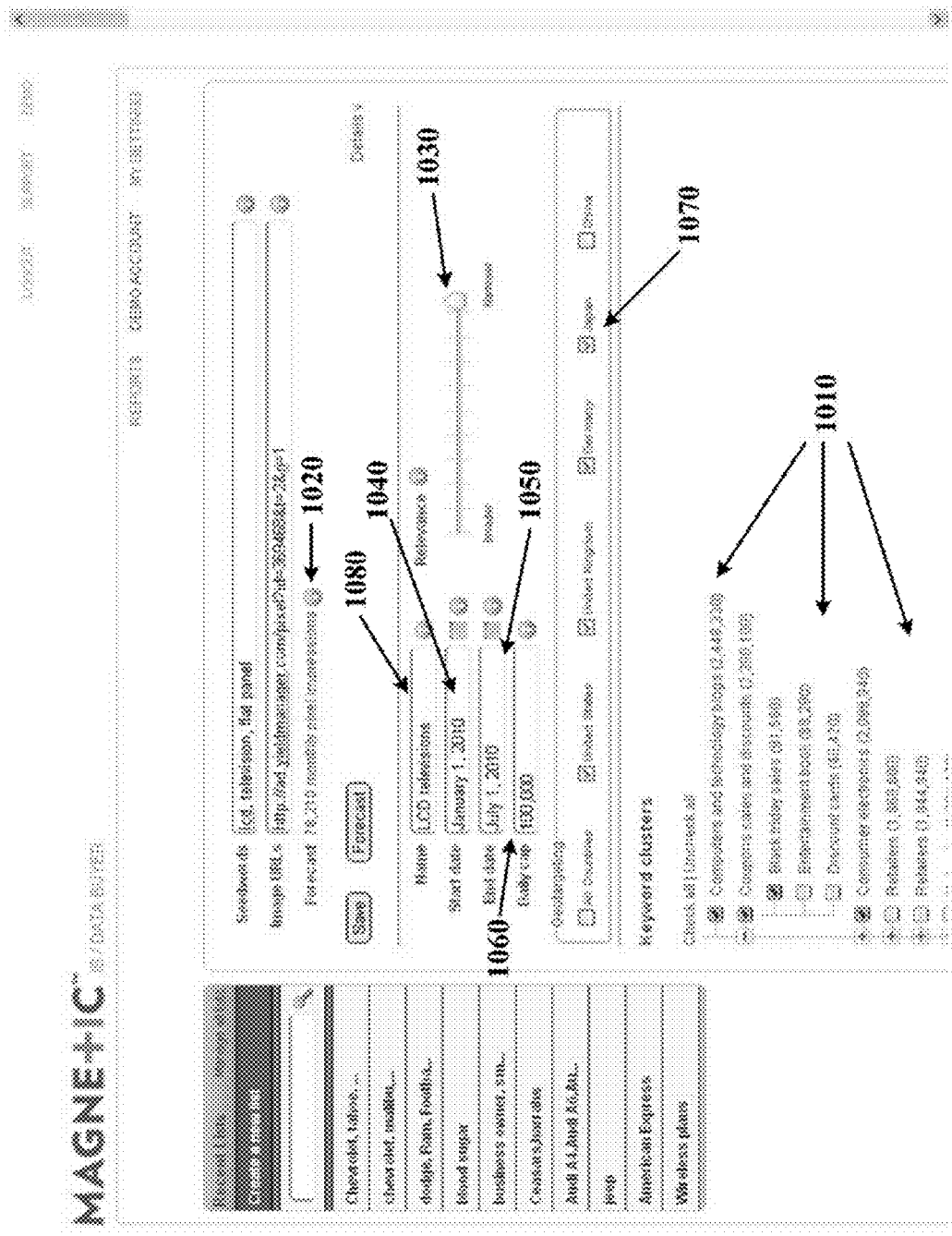
FIG. 10 is an illustrative display for entering campaign targeting requirements and modifying categories and/or keywords in accordance with some embodiments of the present invention.
Figure 11:
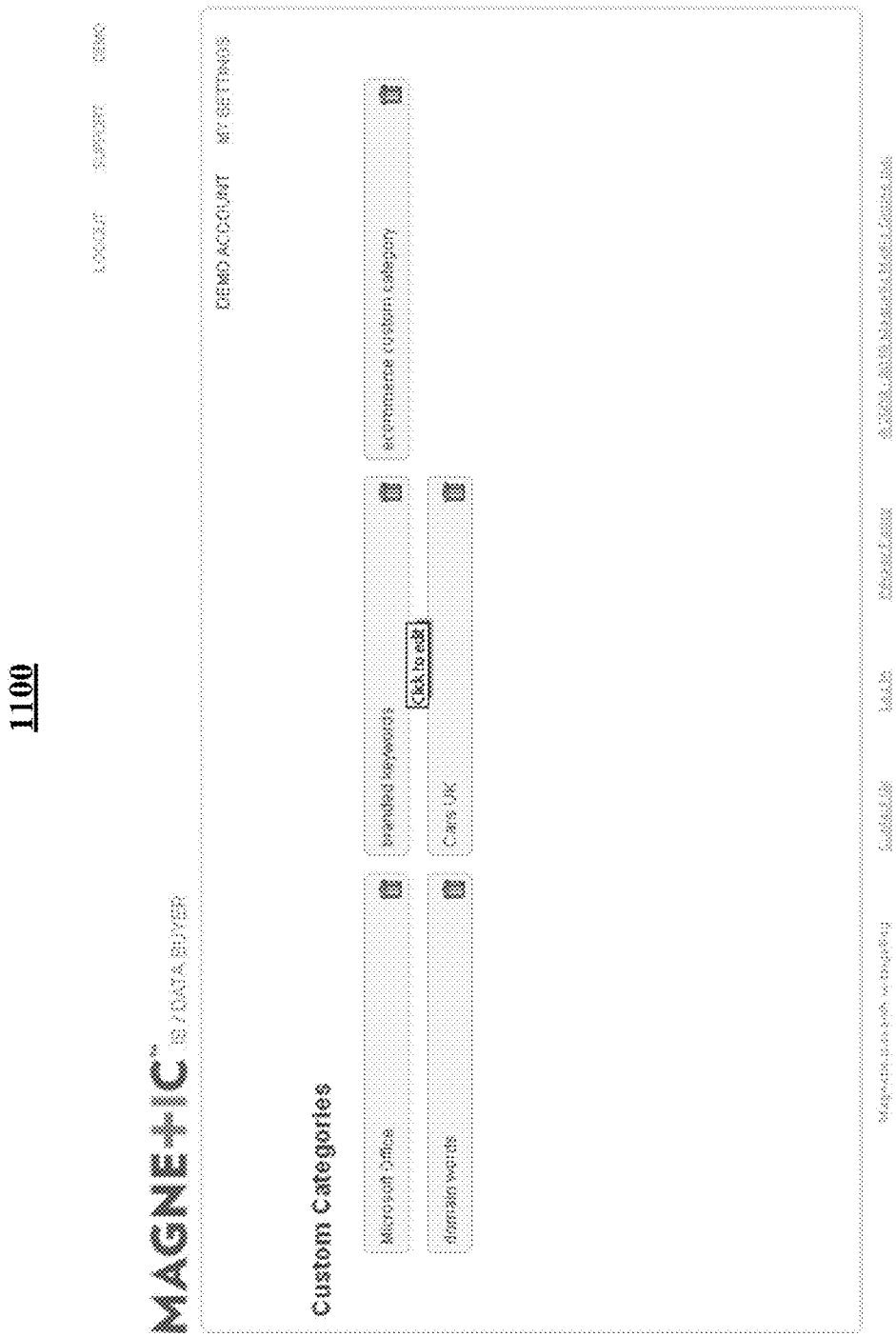
FIG. 11 is an illustrative display for managing custom keyword lists in accordance with some embodiments of the present invention.

In response to entering particular seedwords, the application can automatically select one or more keywords associated with the topic identified by the entered seedwords using, for example, a keyword generation component of the application. As described previously, each keyword can be assigned to one or more categories, where each category relates to a specific topic. As shown in FIG. 10, categories or keyword clusters are provided in response to the entered seedwords. In particular, area 1010 of FIG. 10 shows that, in response to entering the seedwords "lcd, television, flat panel," the application selects keywords in particular categories, such as "Computers and technology blogs," "Coupons, sales, and discounts," "Consumer electronics," and "Retailers."

In some embodiments, the keyboard generation component of the application is based at least in part on a semantic web component that classifies content. The semantic web component can be used to assist advertising entities select keywords generated by the keyword generation component of the application.

It should be noted that any suitable models, such as ontological models, classification models, or relational models, can be used by the semantic web component to classify or categorize data, such as keywords. For example, the application can leverage the open source Open Directory Project, which contains a list or directory of websites. More particularly, the Open Directory Project provides a hierarchical ontological scheme for organizing websites into various categories and sub-categories (e.g., Sports→Basketball→Science→Statistics). However, any other suitable directory or organization of semantic web content can be used by the application.

Figure 14:
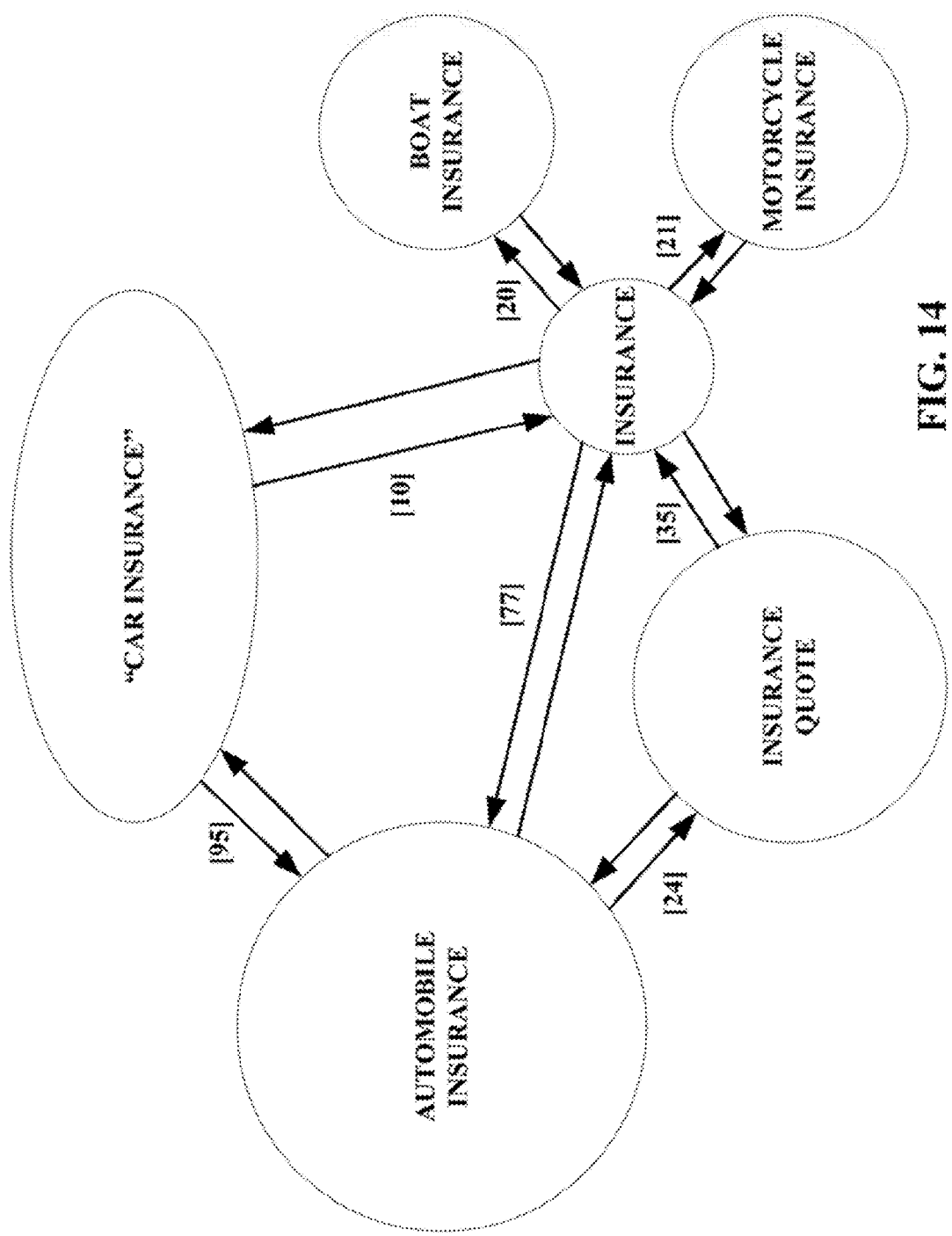
FIG. 14 is a diagram of a semantic web component for assigning weights to each keyword in accordance with some embodiments of the present invention.

More particularly, as described herein, the application can use the semantic web component to organize keywords into particular categories and assign a relatedness factor or any other suitable weight to each keyword. For example, as shown in FIG. 14, in response to the advertising entity entering the seedword "car insurance," the keyword generation component of the application can generate a list of keywords including "automobile insurance," "insurance," "boat insurance," "motorcycle insurance," and "insurance quotes." in addition to generating keywords related to the entered seedword, the semantic web component of the application can assign weights to each keyword that represents the relevance or relatedness to the entered seedwords. As shown in FIG. 14, the keyword "automobile insurance" is highly relevant and has been accorded a weight of 90, while the generic keyword "insurance" is less relevant and has been accorded a weight of 10. It should also be noted that, using the semantic web component, the application can obtain keywords that are related to other keywords—e.g., the generic keyword "insurance" is related to the keywords "insurance quote," "motorcycle insurance," and "boat insurance, among others. FIG. 14 shows an exemplary graph of keywords that are generated and their associated weights in response to entering the seedwords "car insurance."

In response to assigning weights to keywords using the semantic web component, the application can allow the advertising entity to adjust keywords based on relevance. For example, the advertising entity can indicate that keywords should have a relevance factor of at least 90. In FIG. 14, in response to entering the seedwords "car insurance" and requesting a relevance factor of at least 90, the application provides the keyword "automobile insurance." Similarly, in response to requesting a low relevance factor of 10, a large number of keywords including, among others, all of the keywords shown in FIG. 14 can be provided.

Alternatively, instead of assigning an independent weight to each keyword, the semantic web component of the application can assign each and every keyword generated from a user-entered seedwords a weight, where the total of these weights is equivalent to 100%. In response, the advertising entity can enter a desire to obtain the top 85% of the keyword set (e.g., removing keywords like "apartment renters insurance" which has a low degree of relevance to the entered seedwords).

Referring back to FIG. 7, at 720, the application can select multiple keywords based on the entered seedwords and determine a forecasted pixel volume value based on the selected keywords. As described previously, the forecasted pixel volume value can be calculated by querying the daily log files of affiliate web servers receiving the monitoring code to determine how often each of the selected keywords are received. As particular categories can be selected by the application, the forecasted pixel volume value for a particular category is the summation of the forecasted pixel volume value for each keyword associated with the particular category. For example, as shown in FIG. 9, the forecasted pixel volume value for the seedwords "lcd, television, flat panel" is 418,860 monthly pixel impressions (shown in field 930).

It should be noted that pixel volume values associated with particular keywords or particular categories can be calculated and/or updated at any suitable time. For example, the forecasted pixel volume value can be based on a seven day moving average. In another example, instead of providing an estimation of monthly pixel impressions, the application can calculate and display an estimation of daily pixel impressions for the selected keywords.

It should also be noted that the application allows the advertising entity to review the forecasted pixel volume value and modify the selected keywords to achieve a desirable forecasted pixel volume value. For example, in response to the advertiser entering the seedword "phone," the application selects multiple keywords in varying categories, which results in a large number of estimated pixel impressions. Upon reviewing, among other things, budget constraints, the advertiser may want to reduce the forecasted pixel volume value.

It should further be noted that, similar to determining a forecast for given seedwords, the application indicates an estimated forecast for particular categories based on the keywords associated with each category. For example, as shown in FIG. 10, the keywords in the category "Computers and technology blogs" would amount to 2,448,330 monthly pixel impressions.

In some embodiments, the application allows the advertising entity to modify the selected keywords and/or categories. For example, each category (e.g., "Coupon, sales, and discounts") can be selected or deselected for inclusion in the definition of the target topic. In another example, each category can be expanded to show sub-categories or keywords for selection. As shown in area 1010 of FIG. 10, by deselecting one or more categories, sub-categories, or keywords, the forecasted pixel volume value can be reduced. Value 1020 shows that, after reducing the overall number of keywords, the forecasted pixel volume value is reduced to 78,210 monthly pixel impressions.

In some embodiments, the application allows the advertising entity to modify the selected keywords and the forecasted pixel volume value by a relevance factor. As described above, the relevance factor can be, for example, a weight that incorporates the number of selected categories the keyword must be associated with in order to be included in the final list. This creates the association between the keywords and the monitoring code. For example, as shown in FIG. 10, the application provides the advertising entity with a relevance slider option 1030. Upon using a user input device to slide relevance slider option 1030 to the left to indicate a desire to include broader keywords, the application, using a keyword generation component or any other suitable component of the application, generates broader keywords. In a more particular example, the seedwords "car insurance" can result in obtaining the keywords "automobile insurance" and "auto insurance." Upon modifying option 1030 to obtain broader keywords, the application can determine the appropriate keywords and display, for example, the keywords "motorcycle insurance," "boat insurance," and "rate quote." Similarly, option 1030 can be used to generate a narrower set of keywords related to the seedwords (e.g., only the keyword "automobile insurance"). In response to modifying the relevance factor using option 1030 or any other suitable option, the application provides the advertising entity with an updated forecasted pixel volume value (e.g., value 1020).

In some embodiments, the application allows the advertising entity to manage keyword generation. For example, the application can allow the advertising entity to provide a custom list of keywords. In response to receiving the custom list of keywords, the specified keywords in the custom list are targeted. In addition, the custom keyword or keywords are stored in the application. As shown in FIG. 1.1, the application allows the advertising entity to manage these user-specified keywords. For example, the advertising entity can modify and/or remove these keywords. In a more particular example, the application allows the advertising entity to import a file containing the custom list of keywords. As shown in FIG. 12, the application provides an interface for uploading or importing a custom list of keywords in a file (e.g., a text file) generated using any suitable application (e.g., Notepad, Microsoft Excel, etc.). It should be noted that, unlike the use of seedwords, when the application receives a custom list of keywords, keyword generation can be bypassed and the custom list of keywords can be used along with the monitoring code (image URL).

Referring back to FIG. 7, at 730, the application receives an Internet address associated with the monitoring code (e.g., an image URL, a tracking tag provided by an advertisement serving or advertisement exchange system). The address or image uniform resource locator (URL) is the address associated with a tracking tag or any other suitable monitoring code provided by the advertiser's advertisement serving system or advertisement exchange system. As described above, by providing the address associated with the monitoring code, the application can allow the advertising entity to identify or track a user visiting the website and display advertisements and/or any other suitable media content at a later time. More particularly, the monitoring code at the address provided by the advertising entity can be updated based on collected user search information such that particular advertisements are retargeted to the user receiving the updated monitoring code. As shown in FIG. 9, the advertising entity has entered the image URL of "http://ad.yieldmanager.com/pixel?id=3694688&t=2&ri=1" into field 920.

In some embodiments, the application allows the advertising entity to enter multiple addresses (image URLs). For example, the application can allow the advertising entity to enter comma-separated image URLs into field 920 of FIG. 9.

In some embodiments, in addition to updating the monitoring code to retarget advertisements based on the selected topic and/or keywords, the application can insert dynamic components or dynamic replacement elements into the address associated with the monitoring code. For example, the application can insert a random string into the address, which may be useful for cache busting. Cache busting inhibits or minimizes browser applications or proxies from serving web content from their cache for the particular website. By, for example, inserting the random string, the application can drive the browser application to fetch the content (including the monitoring code). This may also provide a more accurate count of requests from users. In another example, the application can insert identification numbers associated with the advertising entity or lists created by the advertising entity. More particularly, if the advertising entity creates a list with multiple keywords and its associated monitoring code and the list has an identification number (e.g., 2938), the application allows the advertising entity to insert a dynamic element, such as MAGNETIC_ID. For example, the dynamic element MAGNETIC_ID can be inserted into the address as follows:

http://my_cookie_host.example.com/?id=9339Afen2&
      segment_id=MAGNETIC_ID

In response to serving, the monitoring code is rewritten, where the dynamic element is replaced, as follows:

http://my_cookie_host.example.com/?id=9339Afen2&
      segment_id=2938

In another suitable example, the application can dynamically pass the keywords to the address using dynamic components. Similar to the identification component above, the application allows the advertiser to pass particular user search information, such as keywords and list information, to the address of the monitoring code. For example, in response to adding the element KEYWORD into the address, the dynamic element is replaced with the best keyword at the time the image URL is served. In another example, in response to adding the element LIST into the address, the dynamic element is replaced with a listing of the keywords. More particularly, if the keywords received are "chairs, desk chairs, office chairs," the dynamic element KEYWORD can be replaced by "chairs" and the dynamic element LIST can be replaced by "chairs, desk chairs, office chairs."

To illustrate these dynamic elements in the address, the advertiser can enter into field 920 of FIG. 9 the following address as follows:

http://ad.mytrackingserver.com/
      tracking?seg=123&keyword=KEYWORD

The actual image that would be called or served on a page receiving the keywords "chairs, desk chairs, office chairs" would be as follows:

http://ad.mytrackingserver.com/tracking?seg=123&
      keyword=chairs

Similarly, the dynamic element KEYWORD can be replaced with the dynamic element LIST:

http://ad.mytrackingserver.com/tracking?seg=123&
      keyword=LIST

The actual image that would be called or served on a page receiving the keywords "chairs, desk chairs, office chairs" would be as follows:

http://ad.mytrackingserver.com/tracking?seg=123&
      keyword=chairs desk chairs, office chair It should be noted that, in some embodiments, the monitoring code, such as a tag, can be updated with the keyword, where the tag is served only when the user searches for the appropriate search terms.

Referring back to FIG. 7, the application can receive campaign targeting requirements for retargeting one or more advertisements or pieces of media content in the inventory of the advertising entity at 740. As shown in FIG. 10, campaign targeting requirements can include a start date for the campaign in field 1030, an end date for the campaign in field 1040, a daily cap 1050, and geotargeting options 1060. Start date 1030 and end date 1040 allow the advertising entity to control when the image URL (monitoring code) is associated with users that are part of the selected topics, categories, and/or keywords. Daily cap 1060 allows the advertising entity to indicate the maximum number of pixels an image URL receives per day. The advertising entity can use daily cap 1060 to control how many pixel impressions and set budget constraints for a particular list. Moreover, daily cap 1060 inhibits the image URL from being served more often than the specified cap. Geotargeting options 1060 allow the advertising entity to indicate which particular countries to serve the image URL. As shown in FIG. 10, geotargeting options 1060 include all countries, the United States, the United Kingdom, Germany, Japan, and China.

In some embodiments, the collection of categories and keywords and one or more pieces of monitoring code can be saved using list field 1080. In response to the advertising entity creating a name for the targeted list, such as "LCD televisions" in field 1080 of FIG. 10, the application can save the one or more user-created lists, which can be displayed on each of the interfaces. For example, FIGS. 8-10 show that recently created lists are displayed while the advertising entity is creating and/or modifying a list.

In some embodiments, the application can allow the advertising entity to manage these targeted lists. In response to providing the application with an indication to manage targeted lists (e.g., selecting a "Manage List" option), the application can provide the advertising entity with display 1300 shown in FIG. 13. In particular, the application can display the user-created lists, where the advertising entity can import other user-created lists, export user-created lists, and/or select to modify a user-created list.

Referring back to FIG. 7, at 750, the application modifies the monitoring code to retarget the media content based on the received seedwords (or custom list of keywords), address (pixel image URL), and campaign targeting requirements. The monitoring code allows the advertising entity to retarget users that saw the monitoring code, for example, in the form of a pixel, and have demonstrated an interest in the related topic.

At 760, the application instructs an advertisement server, an advertisement exchange, or any other suitable system that provides advertisements and/or content to serve retargeted advertisements at the given segment. For example, the application can determine which third-party advertisement serving system retargeting pixels to include by querying the database to determine all retargeting pixels that have been linked to the keyword received. Alternatively, the advertiser can access the advertisement server and instruct the server to use the modified monitoring code for retargeting advertisements.

In some embodiments, the retargeting component of the application that generates monitoring code for retargeting advertisements can transmit the monitoring code to an advertisement serving component of the application. The advertising serving component of the application can, for example, purchase inventory for the advertising entity and/or manage the inventory of advertisements for the advertising entity.

Referring back to FIG. 6, additionally or alternatively to the interfaces described above, the application can provide the advertising entity with one or more interfaces for purchasing media content at 660 and 670. For example, in response to receiving seedwords, campaign targeting requirements, and/or modified monitoring code, the application can provide interfaces for purchasing advertisements and other media content from content providers that meet the targeted audience segments defined by the advertiser. In a more particular example, the application can display screenshots or images of advertisements and/or media content for purchase. In response, the advertiser can select one or more pieces of media content to add to the advertiser's inventory. In another suitable example, in response to receiving targeted audience segments, the application can use user search information to identify the appropriate inventory or provide the advertiser with instructions or guidelines for purchasing advertisements or any other suitable media content for an advertisement inventory.

Figure 15:
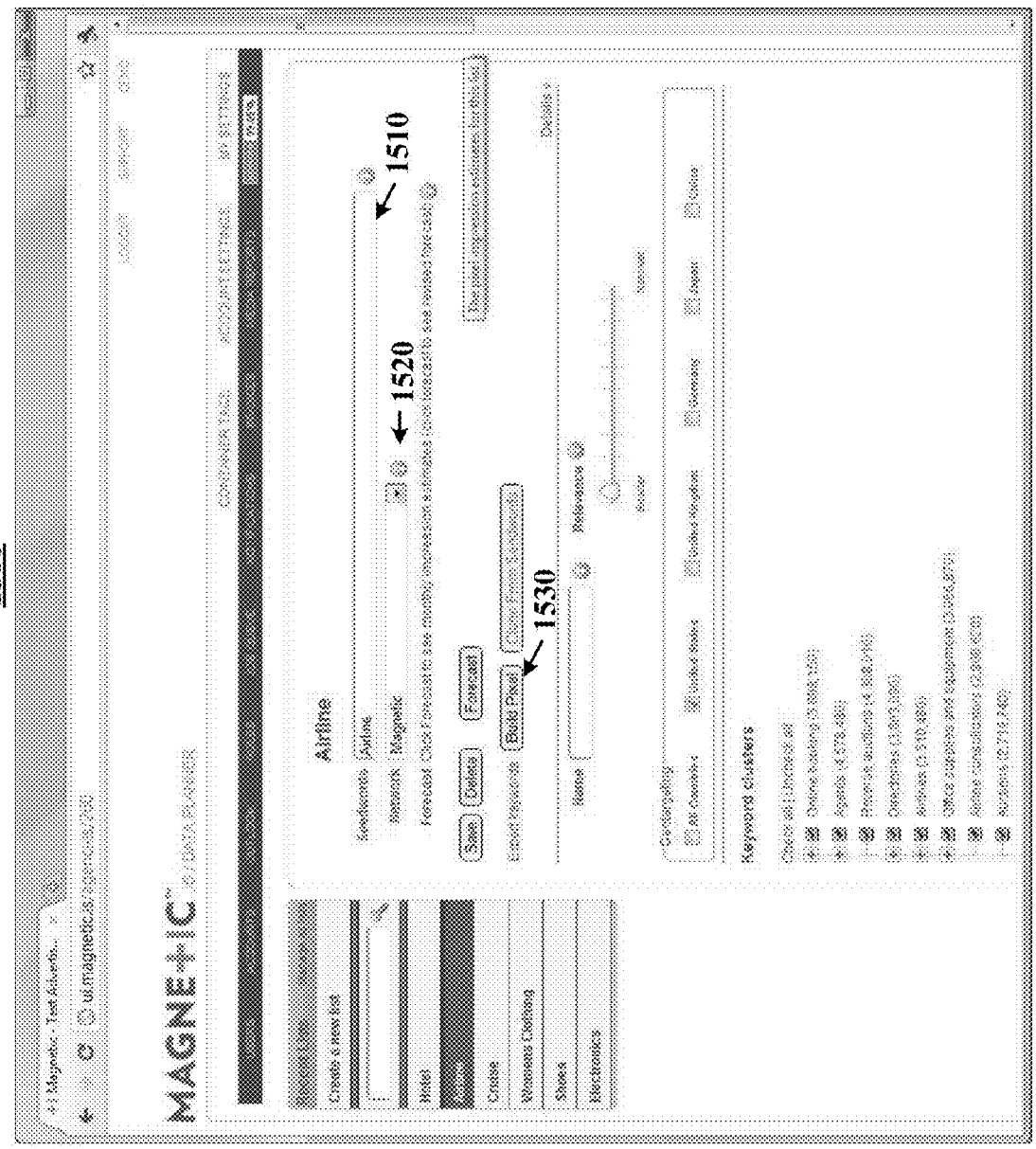
FIG. 15 is an illustrative display provided to a data and media buyer for search retargeting in accordance with some embodiments of the present invention.

For example, the application can provide an advertising entity, such as a data and media buyer with one or more interfaces for purchasing user search information for identifying the appropriate audience segment and purchasing the proper inventory for an advertiser. An illustrative example of these interfaces is shown in FIG. 15. Similar to FIG. 10, FIG. 15 shows that the application provides an opportunity to indicate seedwords in area 1510. In addition to entering seedwords, the application allows the data and media buyer to assign a network in drop-down list 1520. Upon entering this information, the application generates a forecasted pixel volume value and associated information. In response, the application allows the data and media buyer to build a pixel, which may include purchasing the appropriate media that are presented in response to a user performing a search using the keywords, causing the service of the pixel.

Alternatively, in some embodiments, the application can analyze the advertising entity's inventory and determine whether the inventory correlates to the seedwords, keywords, and/or campaign targeting requirements indicated by the advertiser. For example, the application can determine that the advertising entity's inventory does not correspond with the advertising entity's campaign. In response, the application can recommend display advertisements and/or other media content to purchase from particular content providers that corresponds with the advertising entity's campaign.

Figure 16:
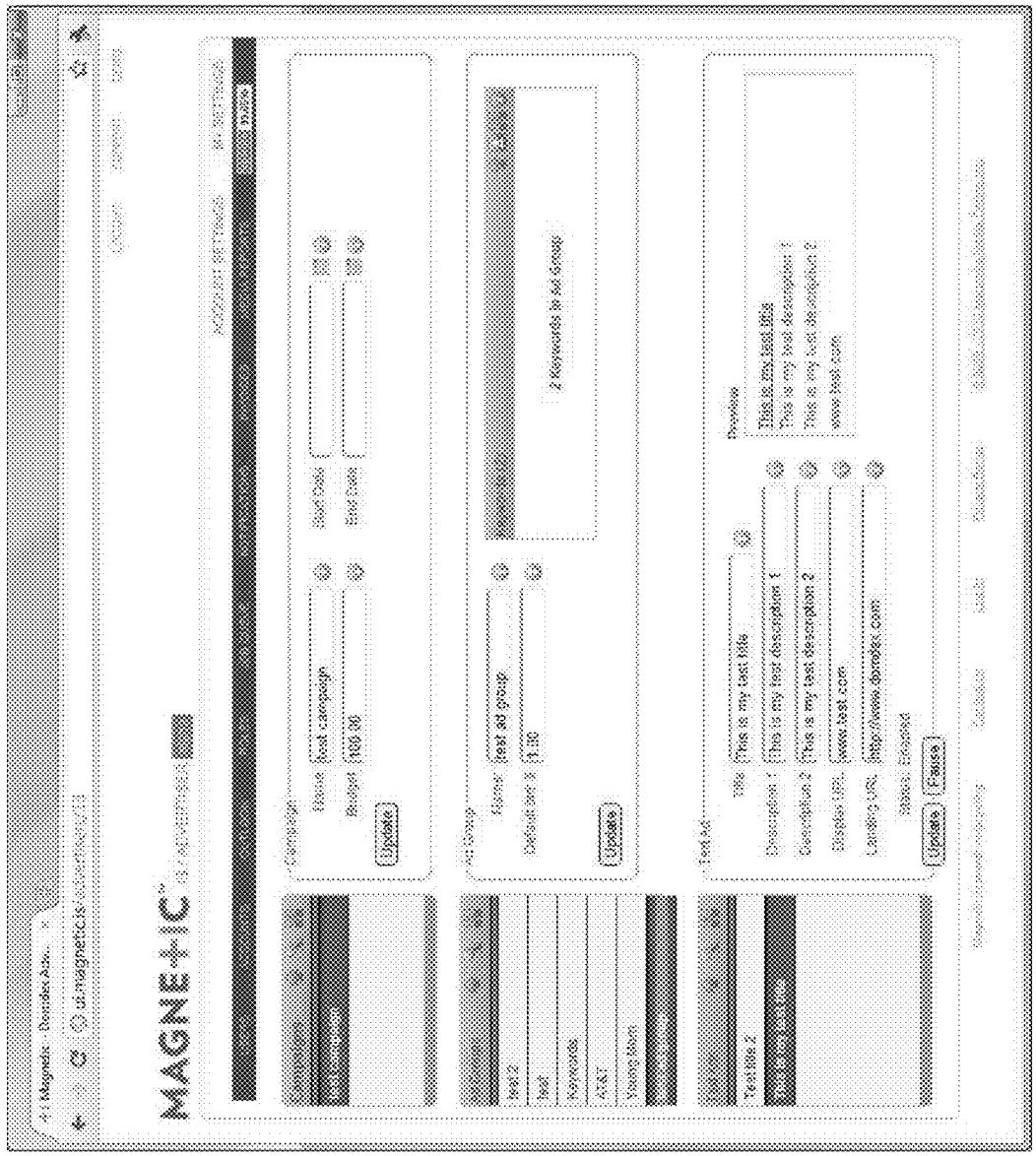
FIG. 16 is an illustrative display provided to a search engine marketer for automatically trafficking advertisements in accordance with some embodiments of the present invention.

Additionally or alternatively, the application can provide an advertising entity, such as a search engine marketer, with one or more interfaces for managing campaigns with user search information. For example, as shown in FIG. 16, a search engine marketer is provided with the opportunity to input campaign information (e.g., name, budget information, start date, end date, etc.), ad group information (e.g., keywords, bid information, etc.), and a text advertisement (e.g., title, description information, display URL, landing URL, etc.). In response to inputting this information, the application automatically traffics the text advertisement based on the inputted information.

Figure 17:
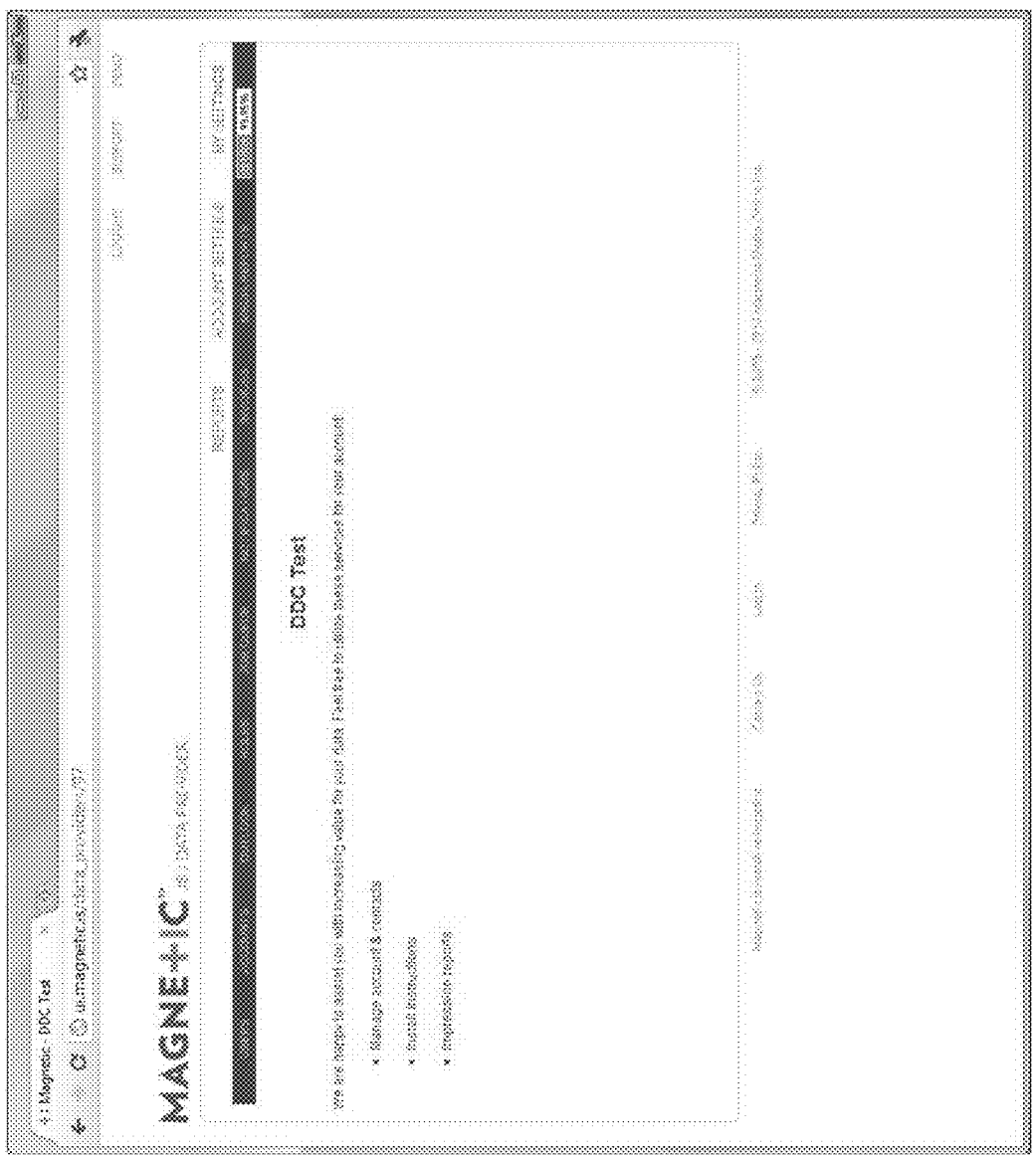
FIG. 17 is an illustrative display provided to a data provided for search retargeting in accordance with some embodiments of the present invention.

Additionally or alternatively, the application can provide an advertising entity, such as a data provider, with one or more interfaces for managing accounts, installing monitoring code, reviewing impression reports. An illustrative example interface is shown in FIG. 17. As shown, the application can provide the data provider with an interface for providing user search information to the application for use by other advertising entities. In addition, the application can provide the data provider with an interface for installing monitoring code on the data provider's website for collecting and monitoring users.

In some embodiments, the application provides the advertising entity with reporting features. For example, as shown in FIG. 18, the application can provide the advertiser with an interface that includes each user-created list (e.g., "blu ray," "camera.photography," "moisturizer,skin," etc.) and advertisement-related information, such as traffic information, average daily impressions, and average daily estimated cost. In a more particular example, in response to selecting one of the user-created lists from reporting display 1500, the application can provide the advertising entity with detailed information relating to the performance of the retargeting campaign. In some embodiments, the application allows the advertising entity to download or export the reporting information.

In some embodiments, the application allows the advertising entity to modify a campaign or list based on a report. For example, a report on a particular campaign can include traffic data or statistics on the monitoring code to determine when during the day, when during the month, or which page of a website optimizes the provision of the monitoring code. In another example, using the reports, the application can provide the advertiser with recommendations on modifying the campaign—e.g., only provide monitoring code in the morning and only include the monitoring code on the home page of the website.

In some embodiments, the application can provide recommendations for optimizing campaigns. For example, similar to the data and statistics displayed in the reports, the application can track clicks, average daily impressions, average daily estimated costs, and conversion information (e.g., whether a user purchased a product or a service) and analyze such data. The application can then provide one or more recommendations to the advertising entity for modifying the campaign.

Figure 19:
FIG. 19 provides illustrative billing displays in accordance with some embodiments of the present invention.

In some embodiments, the application provides the advertising entity with billing features. As described above, the application provides the advertising entity with the costs associated with each user-created list. More particularly, the application can automatically generate invoices and/or statements relating to the one or more user-created lists. For example, FIG. 19 shows an illustrative example of an invoice that includes each piece of monitoring code and the corresponding number of impressions.

Figure 20:
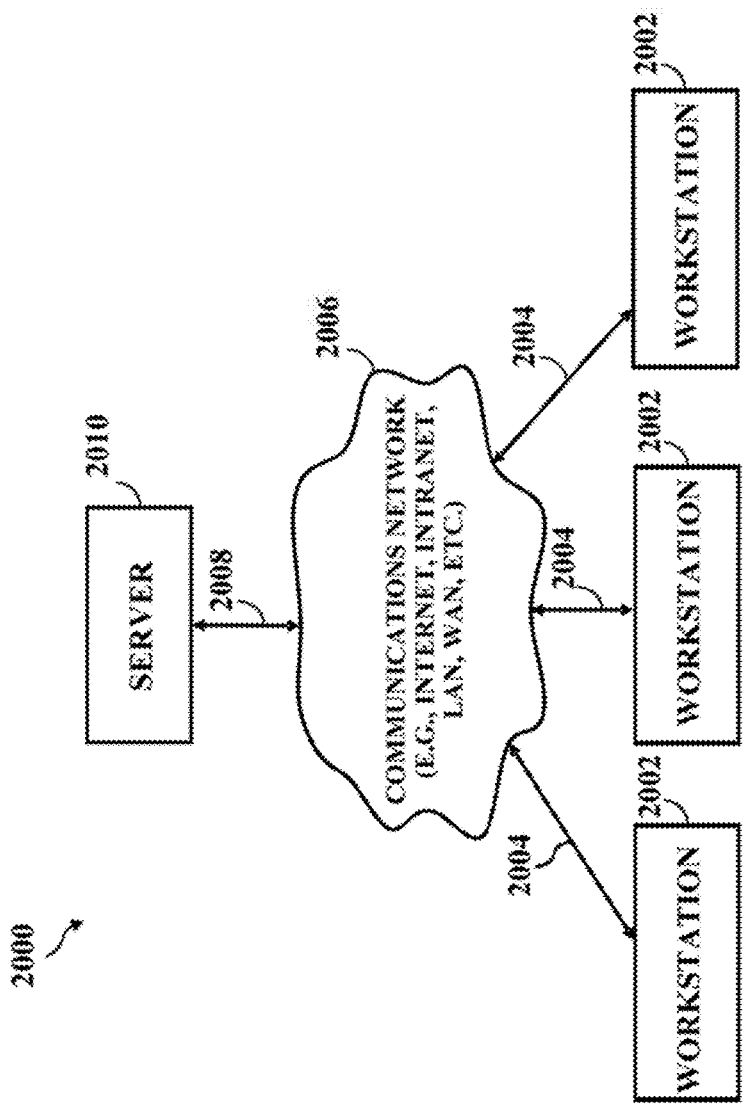
FIG. 20 is a diagram of an illustrative system on which a search retargeting application can be implemented in accordance with some embodiments of the present invention.

FIG. 20 is a generalized schematic diagram of a system 2000 on which the search retargeting application may be implemented in accordance with some embodiments of the disclosed subject matter. As illustrated, system 2000 may include one or more user computers 2002. User computers 2002 may be local to each other or remote from each other. User computers 2002 are connected by one or more communications links 2004 to a communications network 2006 that is linked via a communications link 2008 to a server 2010.

System 2000 may include one or more servers 2010 (e.g., a server that runs the application, an advertisement serving server, etc.). Server 2010 may be any suitable server for providing access to the application, such as a processor, a computer, a data processing device, or a combination of such devices. For example, the application can be distributed into multiple backend components and multiple frontend components or interfaces. In a more particular example, backend components, such as data collection, data distribution, keyword generation and categorization, and forecasting, can be performed on one or more servers 2010. Similarly, the graphical user interfaces displayed by the application, such as a data interface, a display advertising network interface, a search engine marketing self-server advertising interface, and a display self-service advertising interface, can be distributed by one or more servers 2010 to user computer 2002.

More particularly, for example, each of the client 2002 and server 2010 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client 2002 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 20, communications network 2006 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 2004 and 2008 may be any communications links suitable for communicating data between user computers 2002 and server 2010, such as network links, dial-up links, wireless links, hard-wired links, any other suitable communications links, or a combination of such links. User computers 2002 enable a user to access features of the application. User computers 2002 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. User computers 2002 and server 2010 may be located at any suitable location. In one embodiment, user computers 2002 and server 2010 may be located within an organization. Alternatively, user computers 2002 and server 2010 may be distributed between multiple organizations.

Figure 21:
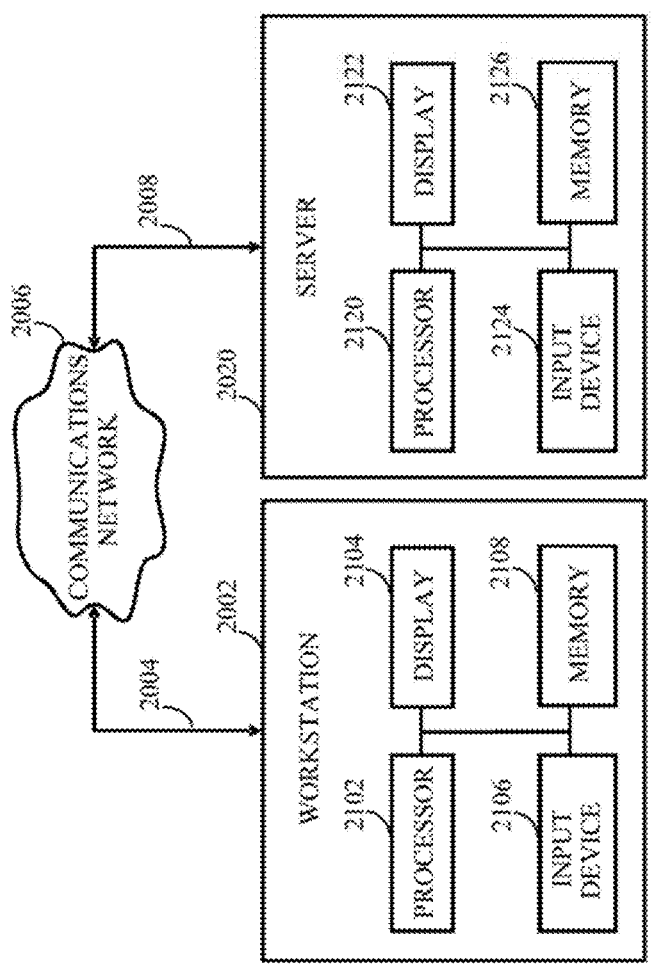
FIG. 21 is a diagram of an illustrative user computer and server as provided, for example, in FIG. 20 in accordance with some embodiments of the present invention.

Referring back to FIG. 20, the server and one of the user computers depicted in FIG. 20 are illustrated in more detail in FIG. 21. Referring to FIG. 21, user computer 2002 may include processor 2102, display 2104, input device 2106, and memory 2108, which may be interconnected. In a preferred embodiment, memory 2108 contains a storage device for storing a computer program for controlling processor 2102.

Processor 2102 uses the computer program to present on display 2104 the application and the data received through communications link 2004 and commands and values transmitted by a user of user computer 2002. It should also be noted that data received through communications link 2004 or any other communications links may be received from any suitable source. Input device 2106 may be a computer keyboard, a cursor-controller, dial, switchbank, lever, or any other suitable input device as would be used by a designer of input systems or process control systems.

Server 2010 may include processor 2120, display 2122, input device 2124, and memory 2126, which may be interconnected. In a preferred embodiment, memory 2126 contains a storage device for storing data received through communications link 2008 or through other links, and also receives commands and values transmitted by one or more users. The storage device further contains a server program for controlling processor 2120.

In some embodiments, the application may include an application program interface (not shown), or alternatively, the application may be resident in the memory of user computer 2002 or server 2010. In another suitable embodiment, the only distribution to user computer 2002 may be a graphical user interface ("GUI") which allows a user to interact with the application resident at, for example, server 2010.

In one particular embodiment, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Accordingly, systems, methods, and media for targeting advertisements based on user search information are provided.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for providing search retargeting to advertising entities, the method comprising:
   receiving, using a hardware processor, one or more seedwords relating to a topic for targeting advertisements associated with an advertiser;
   automatically selecting, using the hardware processor, keywords for the topic based on the received one or more seedwords;
   receiving, using the hardware processor, an address associated with monitoring code and receiving one or more campaign targeting requirements;
   causing, using the hardware processor, the monitoring code at the address to include a dynamic field;
   determining, using the hardware processor, that user search information associated with a user matches at least a portion of the automatically selected keywords and determining that the one or more campaign targeting requirements have been met; and
   replacing, using the hardware processor, the dynamic field of the monitoring code at the received address with the automatically selected keywords in response to the determination such that the monitoring code including the keywords instructs an advertisement server to serve one or more advertisements associated with the advertiser to the user on an affiliate website in response to a device associated with the user loading the affiliate website.

2. The method of claim 1, wherein the monitoring code receives user search information associated with the user and wherein the monitoring code is provided on at least one of: a search engine website, a search toolbar, an electronic commerce website, a parked domain website, and a DNS error website.

3. The method of claim 1, further comprising receiving static and dynamic components for including into the monitoring code.

4. The method of claim 1, further comprising determining and displaying, using the hardware processor, a forecasted pixel volume value based at least in part on the automatically selected keywords, wherein the forecasted pixel volume value is determined by calculating a summation of pixel volume values associated with each keyword assigned to the topic.

5. The method of claim 4, further comprising:
   receiving, using the hardware processor, an indication to modify the automatically selected keywords; and
   determining and displaying, using the hardware processor, an updated forecasted pixel volume value based at least in part on the modified keywords.

6. The method of claim 1, further comprising:
   generating, using the hardware processor, a plurality of recommended keywords for the topic based on the received one or more seedwords, wherein each of the plurality of recommended keywords has a weight corresponding to relevance with the received one or more seedwords;
   receiving, using the hardware processor, a selected relevance; and selecting, using the hardware processor, a subset of the plurality of recommended keywords based on the weight associated with each of the plurality of recommended keywords.

7. The method of claim 4, further comprising displaying, using the hardware processor, a relevance factor option that modifies breadth of the automatically selected keywords, wherein, upon modifying the relevance factor option, the forecasted pixel volume value is determined and displayed.

8. The method of claim 1, wherein the one or more campaign targeting requirements include at least one of: a start date, an end date, a limit on impressions of the monitoring code, and a limit on location on where the monitoring code is served.

9. The method of claim 1, further comprising identifying, using the hardware processor, advertisements for purchasing based at least in part on the user search information, the automatically selected keywords, and the campaign targeting requirements.

10. The method of claim 1, further comprising displaying, using the hardware processor, an interface for purchasing advertisements to serve to the users based at least in part on the user search information.

11. A system for providing search retargeting to advertising entities, the system comprising:
a processor that:
receives one or more seedwords relating to a topic for targeting advertisements associated with an advertiser;
automatically selects keywords for the topic based on the received one or more seedwords;
receives an address associated with monitoring code and receiving one or more campaign targeting requirements;
causes the monitoring code at the address to include a dynamic field;
determines that user search information associated with a user matches at least a portion of the automatically selected keywords and determines that the one or more campaign targeting requirements have been met; and
replaces the dynamic field of the monitoring code at the received address with the automatically selected keywords in response to the determination such that the monitoring code including the keywords instructs an advertisement server to serve one or more advertisements associated with the advertiser to the user on an affiliate website in response to a device associated with the user loading the affiliate website.

12. The system of claim 11, wherein the monitoring code receives user search information associated with the user and wherein the monitoring code is provided on at least one of: a search engine website, a search toolbar, an electronic commerce website, a parked domain website, and a DNS error website.

13. The system of claim 11, wherein the processor is further configured to receive static and dynamic components for including into the monitoring code.

14. The system of claim 11, wherein the processor is further configured to determine and display a forecasted pixel volume value based at least in part on the automatically selected keywords, wherein the forecasted pixel volume value is determined by calculating a summation of pixel volume values associated with each keyword assigned to the topic.

15. The system of claim 14, wherein the processor is further configured to:
receive an indication to modify the automatically selected keywords; and
determine and displaying an updated forecasted pixel volume value based at least in part on the modified keywords.

16. The system of claim 11, wherein the processor is further configured to:
generate a plurality of recommended keywords for the topic based on the received one or more seedwords, wherein each of the plurality of recommended keywords has a weight corresponding to relevance with the received one or more seedwords;
receive a selected relevance; and
select a subset of the plurality of recommended keywords based on the weight associated with each of the plurality of recommended keywords.

17. The system of claim 14, wherein the processor is further configured to display a relevance factor option that modifies breadth of the automatically selected keywords, wherein, upon modifying the relevance factor option, the forecasted pixel volume value is determined and displayed.

18. The system of claim 11, wherein the one or more campaign targeting requirements include at least one of: a start date, an end date, a limit on impressions of the monitoring code, and a limit on location on where the monitoring code is served.

19. The system of claim 11, wherein the processor is further configured to identify advertisements for purchasing based at least in part on the user search information, the automatically selected keywords, and the campaign targeting requirements.

20. The system of claim 11, wherein the processor is further configured to display an interface for purchasing advertisements to serve to the users based at least in part on the user search information.

21. A non-transitory computer-readable medium containing computer-executable instructions that, when executed by a processor, cause the processor to perform a method for providing search retargeting to advertising entities, the method comprising:
receiving one or more seedwords relating to a topic for targeting advertisements associated with an advertiser;
automatically selecting keywords for the topic based on the received one or more seedwords;
receiving an address associated with monitoring code and receiving one or more campaign targeting requirements;
causing the monitoring code at the address to include a dynamic field;
determining that user search information associated with a user matches at least a portion of the automatically selected keywords and determining that the one or more campaign targeting requirements have been met; and
replacing the dynamic field of the monitoring code at the received address with the automatically selected keywords in response to the determination such that the monitoring code including the keywords instructs an advertisement server to serve one or more advertisements associated with the advertiser to the user on an affiliate website in response to a device associated with the user loading the affiliate website.

\* \* \* \* \*